United States Patent [19]
Sugaya et al.

[11] Patent Number: 5,870,634
[45] Date of Patent: Feb. 9, 1999

[54] IMAGE BLUR SUPPRESSION DEVICE UTILIZING A VIBRATION MOTOR

[75] Inventors: Isao Sugaya, Yokohama; Tadao Takagi, Yokohamashi, both of Japan

[73] Assignee: Nikon Corporation, Tokyo, Japan

[21] Appl. No.: 635,706

[22] Filed: Apr. 22, 1996

[30] Foreign Application Priority Data

Apr. 21, 1995 [JP] Japan .................................. 7-096875

[51] Int. Cl.⁶ .................................................. G03B 17/00
[52] U.S. Cl. .............................................. 396/52; 396/55
[58] Field of Search ........................................ 396/52, 55

[56] References Cited

U.S. PATENT DOCUMENTS

| | | | |
|---|---|---|---|
| 5,153,633 | 10/1992 | Otani | 396/55 |
| 5,416,558 | 5/1995 | Katayama et al. | 396/52 |
| 5,592,251 | 1/1997 | Kai | 396/55 |
| 5,619,293 | 4/1997 | Usui | 396/55 |
| 5,671,448 | 9/1997 | Usui | 396/55 |

*Primary Examiner*—Russell Adams

[57] ABSTRACT

A compact and lightweight image blur suppression device is shown and described that is superior in responsiveness and quietness, and has a reduced number of parts. In general, a lens frame with an image blur optical system is shifted in a direction opposite to the direction of vibration by a vibration motor. The image blur suppression device is for suppressing image blur in an image formed by a main optical system having an optical axis. The image blur suppression device has an image blur suppression optical system arranged to move within a plane substantially orthogonal to an optical axis of the main optical system and a vibration motor for providing a drive source to move the image blur suppression optical system so as to compensate for image blur.

28 Claims, 30 Drawing Sheets

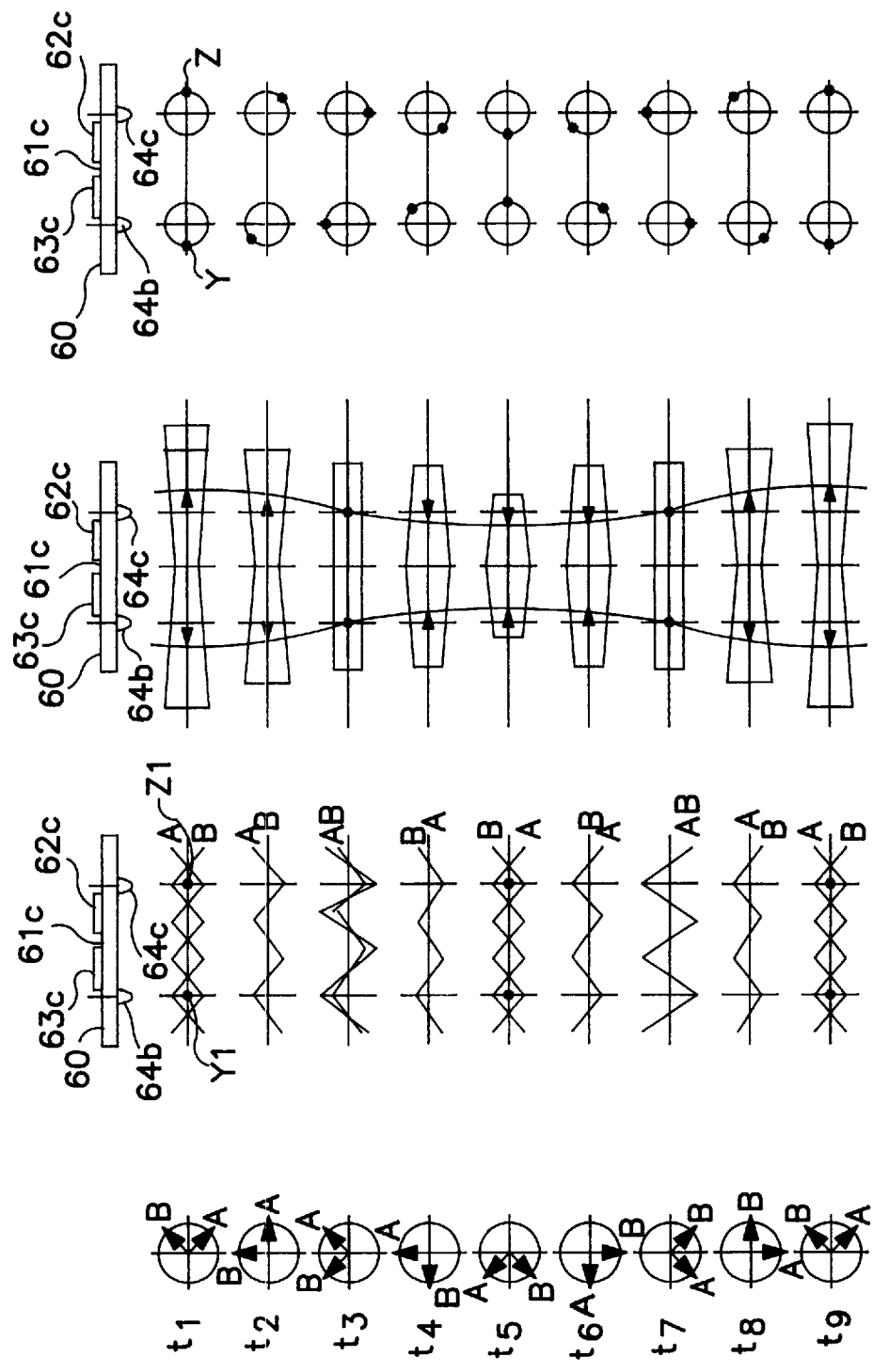

IMAGE BLUR SUPPRESSION DEVICE UTILIZING A VIBRATION MOTOR

BACKGROUND OF THE INVENTION

1. Field of the Invention

The present invention relates to an image blur suppression device for a camera or other optical devices, suppress to image blur caused, for example, by shaking the camera, and in particular to a vibration motor for use in driving an optical system of an image blur suppression device.

2. Description of the Related Art

Image blur suppression devices have as their object, suppression of, or reduction of, blurring in an image projected onto an image plane. A motion compensation device is a type of image blur suppression device which compensates for motion incident upon an optical system which projects the image onto the image plane. Motion is typically imparted to the optical system by way of vibrations in the optical system, or in the surrounding holding member. In general, known motion compensation devices cause a compensation lens to shift counter to the motion of the optical system so as to shift the image projected by the optical system relative to the optical system.

In recent years, progress has been made in the automation of cameras, for example, automatic exposure, automatic film winding, automatic speed lights, as well as automatic focus. As a result, photographs are easier to produce. However, the high magnification of zoom compact cameras, and in particular long focal point distance photography, increases the effect of image blur caused by camera shake.

Japanese Patent Publication Number Hei 3-110530, and Japanese Patent Publication Number Hei 5-95204, propose image blur suppression devices which attempt to prevent image blur by correcting camera shake during photography.

FIG. 33 is a perspective diagram of an example of a camera with a known blur image blur suppression device. An image blur suppression optical system 9 for a camera 1 generally comprises: angular velocity sensors 2 and 3 to detect motion in a horizontal direction (left and right movements of the camera in the yawing direction and X direction) and a vertical direction (up and down movements of the camera in the pitching direction and Y direction) in a plane orthogonal to an optical axis Z of the camera 1; two transmission gear arrays 5 and 6 which drive a lens frame 4, supporting a lens, in the X direction and Y direction respectively; and electro-magnetic motors 7 and 8 connected to transmission gear arrays 5 and 6, respectively. The lens frame 4 is shifted in the direction opposite to the direction of motion by activating electro-magnetic motors 7 and 8 based on the motion information obtained from the outputs of angular velocity sensors 2 and 3. In general, camera shake is compensated during photography and image blur is prevented by canceling the movement of the image by shifting the lens frame in a direction opposite to the direction of movement.

Because conventional image blur suppression devices use high speed rotation, low torque electro-magnetic motors 7 and 8 as the drive source, torque is increased by connecting the electro-magnetic motors 7 and 8 to gear arrays 5 and 6, which are speed reduction mechanisms. However, this increases the weight and size of the camera. Also, the gear arrays 5 and 6 are composed of multiple gears, increasing the number of parts, complicating the structure, and increasing the cost of manufacturing and assembling the parts. Further, backlash and inertia is imparted by the gears of transmission gear arrays 5 and 6. It is therefore fundamentally difficult to improve the extremely critical start-up responsiveness during activation creating unavoidable mechanical noise. In addition, to shift lens frame 4 independently in the X direction and Y direction respectively, it is necessary to provide transmission gear arrays as well as electro-magnetic motors for each direction. This leads to a large, heavy, complicated and noisy camera.

SUMMARY OF THE INVENTION

Accordingly, it is an object of the present invention to provide an image blur suppression device which is compact and lightweight.

It is also an object of the present invention to provide an image blur suppression device having an improved responsiveness, in particular, an improved start-up responsiveness.

It is an object of the present invention to provide an image blur suppression device which is extremely quiet, and has a reduced number of parts.

Additional objects and advantages of the invention will be set forth in part in the description which follows, and, in part, will be obvious from the description, or may be learned by practice of the invention.

Objects of the present invention are achieved in an image blur suppression device having an image blur suppression optical system arranged to move freely within a plane orthogonal to the optical axis of a main optical system so as to prevent image blur wherein a drive source of the image blur suppression optical system is a vibration motor.

Objects of the present invention are also achieved in an image blur suppression device, as set forth above, in which a vibration motor obtains a drive force from a specified position by generating two vibration modes, a synthesis of which produces an elliptical movement.

Objects of the present invention are also achieved in an image blur suppression device, as set forth above, in which the vibration motor is arranged such that a lens frame which supports the image blur suppression optical system moves freely on a plane orthogonal to the optical axis.

Objects of the present invention are also achieved in an image blur suppression device, as set forth above, in which the image blur suppression optical system includes a slide surface arranged opposite the vibration motor, and an energization mechanism which energizes the vibration motor to make contact with the slide surface.

Objects of the present invention are also achieved in an image blur suppression device, as set forth above, in which the vibration motor is free to move in two dimensions.

Objects of the present invention are also achieved in an image blur suppression device, as set forth above, in which the vibration motor is hollow and provides an opening to house the lens.

Objects of the present invention are also achieved in a image blur suppression device, as set forth above, in which the vibration motor has an elastic member, composed of elastic material, forming a hollow circular plate, and an electro-mechanical converting element joined to the elastic member which is vibrated by drive signals and generates expansion, contraction and flex movement on the elastic member, thereby generating elliptical movement on a specified part of the elastic member.

Objects of the present invention are also achieved in an image blur suppression device, as set forth above, in which a ratio of an external diameter and an internal diameter of the elastic member is adjusted such that the respective resonance frequencies of the expansion contraction and flex movements nearly agree.

Objects of the present invention are also achieved in a image blur suppression device, as set forth above, further comprising a drive force take-off member on the specified part of the elastic member.

Objects of the present invention are also achieved in an image blur suppression device, as set forth above, in which the end of the drive force take-off member is a curved surface member.

Objects of the present invention are also achieved in an image blur suppression device, as set forth above, in which the drive force take-off member is joined to the surface of the electro-mechanical converting element through an insulating member.

Objects of the present invention are also achieved in an image blur suppression device, as set forth above, in which the flex vibration causes one or two joint circles to be produced on the elastic member.

Objects of the present invention are also achieved in an image blur suppression device, as set forth above, in which the electro-magnetic converting element is divided into multiple units arranged on one surface of the elastic member.

Objects of the present invention are also achieved in an image blur suppression device, as set forth above, in which an electro-mechanical converting element is provided separately on both surfaces of the elastic member.

Objects of the present invention are also achieved in an image blur suppression device, as set forth above, in which the electro-mechanical converting element is laminated on one surface of the elastic member.

Objects of the present invention are also achieved in an image blur suppression device, as set forth above, in which the vibration motor has an elastic member with an external shape configured by a polygon having at least one pair of opposing parallel sides, and which presents a frame shape, and an electro-mechanical converting element joined to the frame side part, including the parallel sides of the elastic member, and generates longitudinal vibration mode and flex vibration mode on the frame side parts using the drive signals, and generates elliptical movement on the specified position of the frame side part using the synthetic movement of the longitudinal and flex vibration modules.

Objects of the present invention are also achieved in an image blur suppression device, as set forth above, in which the electro-mechanical converting elements joined to the frame side part are controlled so as to be mutually independent.

Objects of the present invention are also achieved in an image blur suppression device, as set forth above, in which a drive force take-off member is positioned on a specified position of the frame side part.

Objects of the present invention are also achieved in an image blur suppression device, as set forth above, in which the end of the drive force take-off member is a curved surface member.

Objects of the present invention are also achieved in an image blur suppression device, as set forth above, in which the polygon is a regular quadrangle, and the specified position is near a vertex of the regular quadrangle.

Objects of the present invention are also achieved in an image blur suppression device, as set forth above, in which the polygon is a regular hexagon, and the specified position is near a vertex of the regular hexagon.

Objects of the present invention are also achieved in an image blur suppression device, as set forth above, in which the vibration motor is at least two impact drive type actuators, each of which provide: a relative movement member, an electro-mechanical converting element of which one end is arranged on the relative movement member, and which is excited by applying voltage, and an inertia member which is attached to the other end of the electro-mechanical converting element, and which imparts impact force to the relative movement member.

Objects of the present invention are also achieved in an image blur suppression device, as set forth above, in which the impact drive type actuators are arranged such that the lens frame which supports the lens of the image blur suppression optical system moves freely in a plane orthogonal to the optical axis.

Objects of the present invention are also achieved in an image blur suppression device, as set forth above, in which the impact drive type actuators are arranged in four positions where two hypothetical straight lines orthogonal at the center of the lens frame intersect with the circumference of the lens frame, taking the lens frame to be the relative movement member.

Objects of the present invention are also achieved in an image blur suppression device, as set forth above, in which eight impact drive type actuators are installed in symmetrical positions on the hollow frame on which are secured separate flange parts that protrude from the outer surface of the lens frame.

Objects of the present invention are also achieved in an image blur suppression device, as set forth above, in which both the outer shape and the inner shape of the frame are square, by the symmetrical positions being near the vertices of the frame, and by a total of eight impact drive type actuators arranged along each side part of the frame near the four vertices such that two each are mutually perpendicular.

Objects of the present invention are also achieved in an image blur suppression device, as set forth above, in which both the outer shape and inner shape of the frame is circular, where the symmetrical positions are four positions where two hypothetical straight lines which are orthogonal at the center of the frame intersect with the frame, and also where eight impact drive type actuators are arranged, two each facing opposite to the same direction at the four positions.

Objects of the present invention are also achieved in an image blur suppression device for suppressing image blur in an image formed by a main optical system having an optical axis, the image blur suppression device comprising an image blur suppression optical system arranged to move freely within a plane substantially orthogonal to the optical axis of the main optical system, and a vibration motor for providing a drive source to move the image blur suppression optical system so as to compensate for image blur.

BRIEF DESCRIPTION OF THE DRAWINGS

These and other objects and advantages of the invention will become apparent and more readily appreciated from the following description of the preferred embodiments, taken in conjunction with the accompanying drawings of which:

FIGS. 24A through 24D are diagrams of the operation of a vibration motor in accordance with the ninth preferred embodiment of the present invention.

DESCRIPTION OF THE PREFERRED EMBODIMENTS

Figure 2:
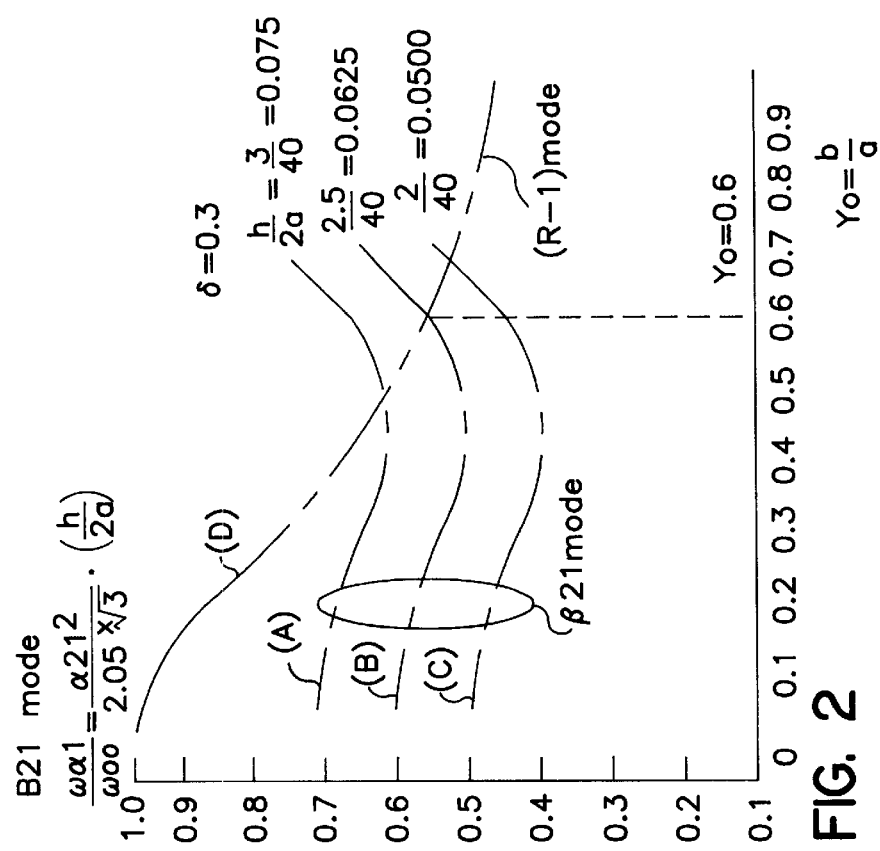
FIG. 2 is a graph of the relationship between the shape of an elastic member and $W_{a1}/W_{00}$.

Reference will now be made in detail to the present preferred embodiments of the present invention, examples of which are illustrated in the accompanying drawings, wherein like reference numerals refer to like elements throughout.

Briefly stated, the present invention utilizes a vibration motor, for example an ultrasonic motor, as the drive source of an image blur suppression optical system of an image blur suppression device.

Figure 1:
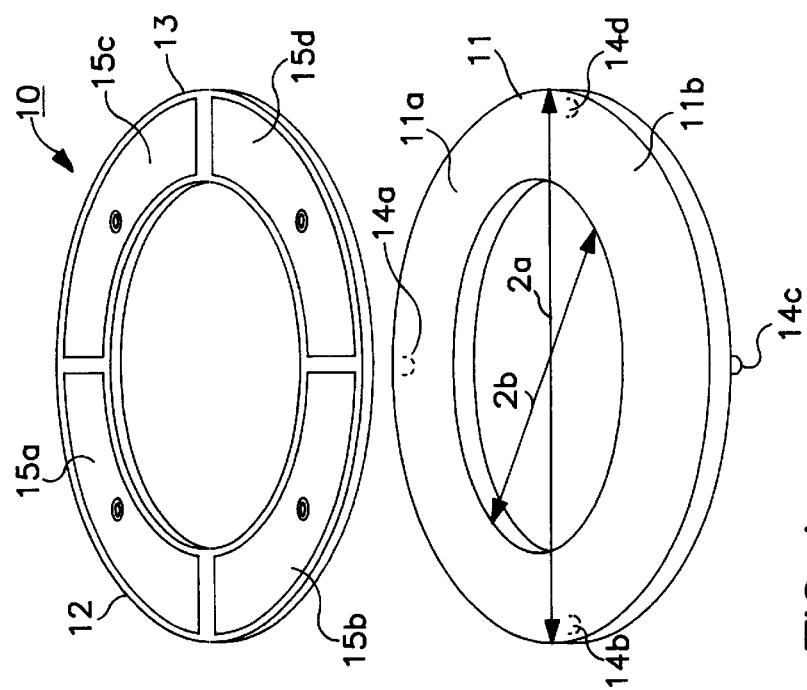
FIG. 1 is a perspective diagram a ring-shaped vibration motor in accordance with a first preferred embodiment of the present invention.

FIG. 1 is a perspective diagram of a ring-shaped vibration motor 10 used in accordance with a first preferred embodiment of the present invention. The ring-shaped vibration motor 10 generally comprises an elastic member 11 formed from an elastic material and made into a hollow circular plate shape; two piezoelectric elements 12 and 13, which are joined to a surface 11a of one side of elastic body 11, for example, by an adhesive, and four drive force take-off members 14a, 14b, 14c and 14d formed on a surface 11b of the elastic member 11. The piezoelectric elements are excited by drive signals to produce expansion and contraction movement along with flex vibration on the elastic body 11, and, by the degeneration of these movements and vibrations, produce elliptical movement on a specified part of the elastic body 11. The elastic body 11 has an inner diameter 2b and an outer diameter 2a.

The piezoelectric elements 12 and 13 are hollow semi-circular plates, preferably manufactured out of PZT. The piezoelectric material of piezoelectric elements 12 and 13 are polarized in one direction, and two phase input voltages A and B are applied. The piezoelectric elements 12 and 13 have four quarter circular electrode plates 15a, 15b, 15c, and 15d mounted on the surfaces of piezoelectric elements 12 and 13 with, for example, adhesives.

FIG. 2 is a graph of the relationship between the shape of the elastic member 11 and $W_{a1}/W_{00}$. The elastic member 11 is a hollow circular plate type elastic member, and is manufactured out of an elastic material such as metal or plastic. The elastic member 11 is capable of having agreement between the expansion and the contraction movements (R1 mode: vibration which broadens in the surface direction), and the secondary flex vibration ($B_{21}$ mode) if the dimensions of the hollow circular plate are properly established. In accordance with the present embodiment the diameter $2b$ of the inner hole of the elastic member 11 is adjustable.

The horizontal axis in FIG. 2 indicates the ratio $y=b/a$ between the outer diameter $2a$ and the inner diameter $2b$ of the elastic member 11. At the 0 position there is no hole inside the elastic member 11. As 1 is approached, the hole becomes larger. The vertical axis indicates the ratio of resonance frequencies $W_{00}$ of the R1 mode in relation to the resonance frequency $W_{a1}$ of the $B_{21}$ mode, specifically, $W_{a1}/W_{00} = \{a_{21}^2/[2.05\times(3)^{1/3}]\}\times(h/2a)$.

Curve (A) in FIG. 2 indicates the R1 mode, while curve (B), curve (C) and curve (D) are cases of the $B_{21}$ mode wherein the value of h (thickness of the circular plate)/$2a$ differs by 3/40, 2.5/40, and 2/40, respectively. If the thickness h=2.5 mm, and the external diameter $2a$=40 mm, it is possible to have degeneration in the vicinity of y=0.6. This results in a highly effective elliptical movement because the ratio of the outer diameter $2a$ and the inner diameter $2b$ of elastic member 11 are such that the respective resonance frequencies of the expansion and contraction movement and flex vibration produced on the elastic member 11 nearly agree.

The drive force take-off members 14a, 14b, 14c, and 14d take off the elliptical movement of the elastic member 11, and make relative movement while contacting a fixed member (relative movement member, not shown). The drive force take-off members 14a, 14b, 14c, and 14d are on the lower surface of the elastic member 11 and are provided in four locations on that outside edge part at every 90°. Spherical bodies of silicon nitride, etc. are typically attached to the drive force take-off members 14a–14d to improve anti-abrasion characteristics.

To effectively take off drive force, the drive force take-off members 14a–14d are preferably provided at positions which there are away from longitudinal vibration joints. For example, the drive force take-off members 14a–14d may be provided in the middle position of the up and down vibration in a nearly perpendicular direction in relation to the plane of movement produced by the flex vibration mode.

Figure 3:
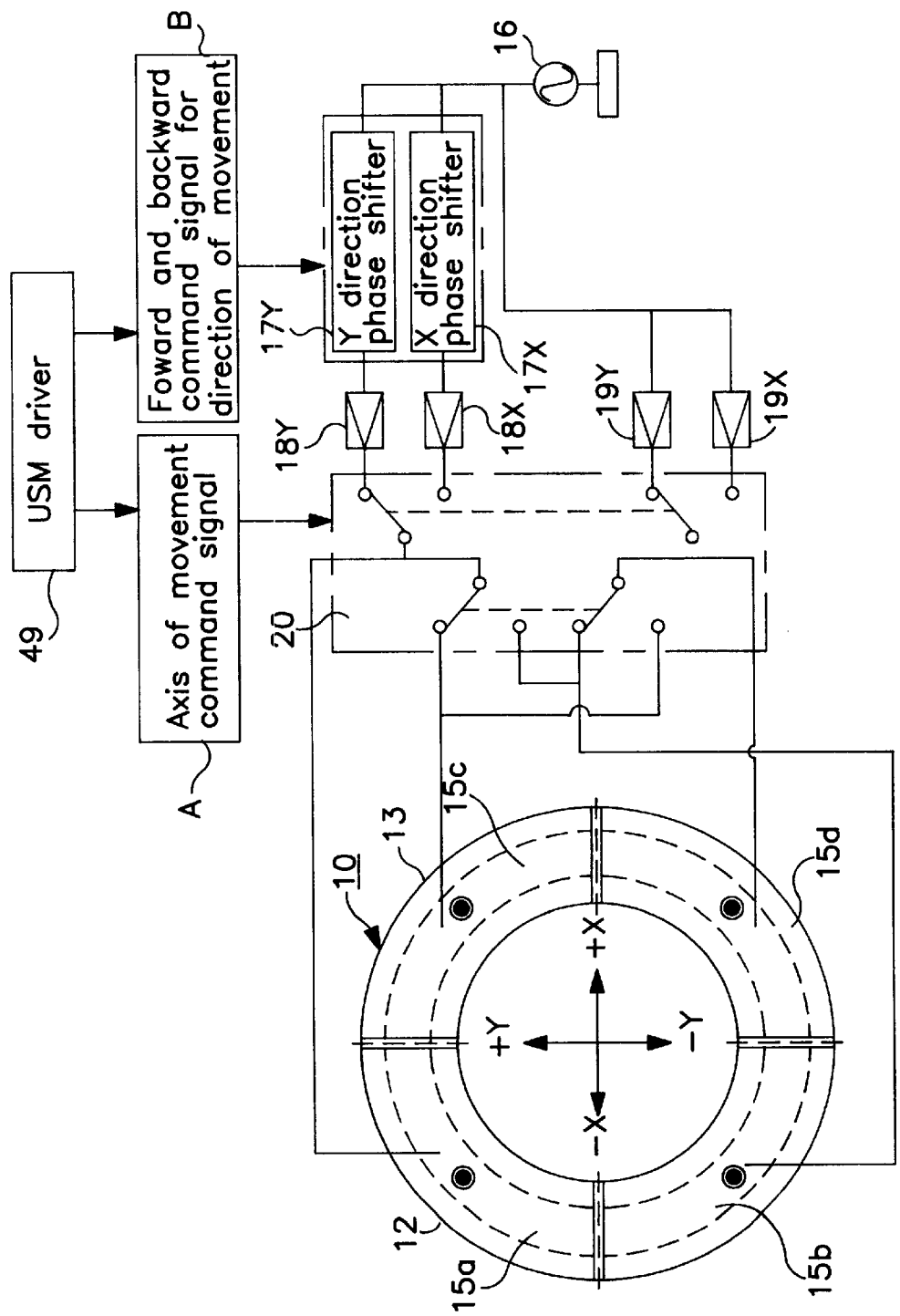
FIG. 3 is a diagram of a drive circuit of an vibration motor in accordance with the first preferred embodiment of the present invention.

FIG. 3 is a diagram of a drive circuit of a vibration motor in accordance with a first preferred embodiment of the present invention. An oscillator 16 applies high frequency voltages A and B to the two piezoelectric elements 12 and 13 based on movement commands from a USM driver 49. The output of the oscillator 16 is split, and after the phase has been temporally shifted by $\pi/2$ by a phase shifter 17X (for the X direction) and a phase shifter 17Y (for the Y direction), one side is connected to an amplifier 18X (for the X direction) and an amplifier 18Y (for the Y direction). The other output of the oscillator 16 is directly connected to an amplifier 19X (for the X direction) and an amplifier 19Y (for the Y direction).

Each amplifier 18X, 18Y, 19X, and 19Y is connected to the electrode plates 15a, 15b, 15c, and 15d by a transfer switch 20.

When the contact points of the transfer switch 20 are all switched to the X side (shown by the dotted lines), the output of the amplifier 18X is connected to electrode plates 15a and 15b, and the output of the amplifier 19X is connected to the electrode plates 15c and 15d. Consequently, the electrode plates 15a and 15b of the left side are grouped, and the electrode plates 15c and 15d of the right side are grouped, causing the vibration motor 10 to move in the X direction. In the same way, when the contact points of the transfer switch 20 are all switched to the Y side (shown by the solid lines), the output of the amplifier 18Y is connected to the electrode plates 15a and 15c, and the output of the amplifier 19Y is connected to the electrode plates 15b and 15d. Consequently, the upper side electrode plates 15a and 15c are grouped, and the lower side electrode plates 15b and 15d are grouped, causing the vibration motor 10 to move in the Y direction. In this configuration, the R1 mode and the $B_{21}$ mode are allowed to degenerate. The joint during R1-$B_{21}$ mode is indicated by the dotted lines.

Figure 4D:
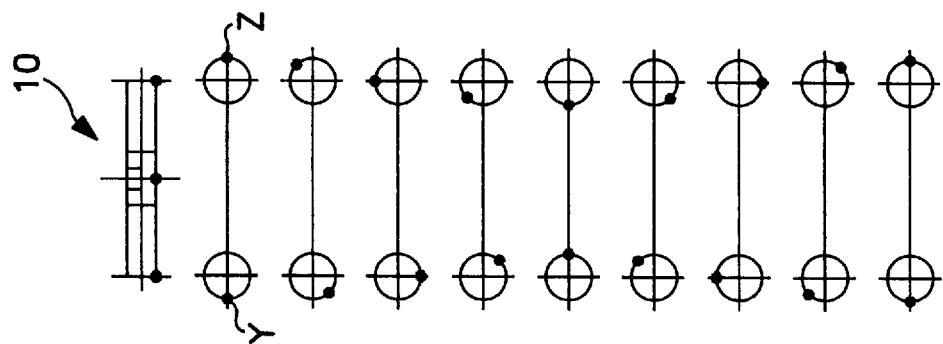
FIGS. 4A–4D are diagrams of the operation of the vibration motor in accordance with the first preferred embodiment of the present invention.
Figure 4C:
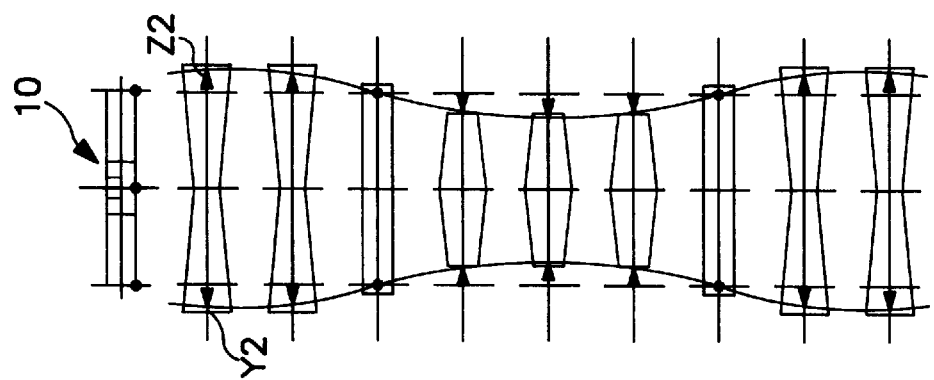
Figure 4B:
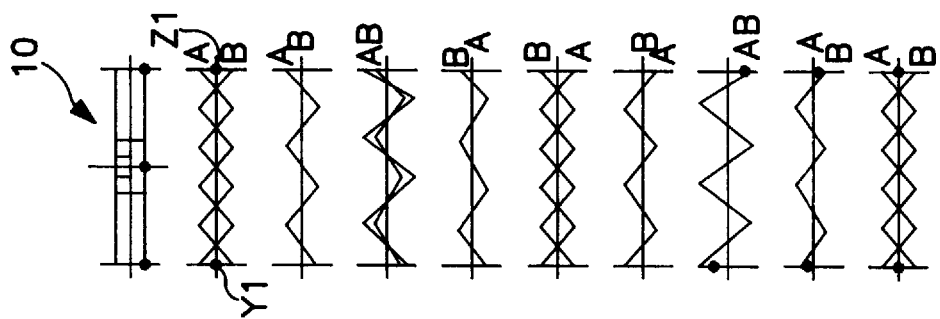
Figure 4A:
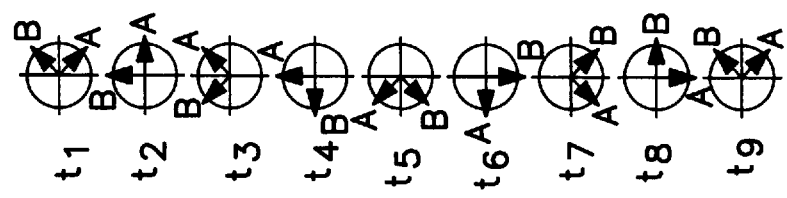

FIG. 4A indicates the temporal changes of the two phase high frequency voltages A and B which are input to the vibration motor 10 (shown in FIG. 3) at times $t_1$–$t_9$. The horizontal axis in FIG. 4A indicates the actual value of the high frequency voltage. FIG. 4B indicates the cross-sectional transformations of vibration motor 10, and indicates the temporal changes ($t_1$–$t_9$) of the flex vibration produced by vibration motor 10. FIG. 4C indicates the cross-sectional transformations of the vibration motor 10, and indicates the temporal changes ($t_1$–$t_9$) of the expansion and contraction vibration produced by the vibration motor 10. FIG. 4D indicates the temporal changes ($t_1$–$t_9$) of the elliptical movement produced by the drive force take-off members 14a through 14d of the vibration motor 10.

As indicated in FIG. 4A, at time $t_1$, the high frequency voltage A produces a positive voltage while the high frequency voltage B also produces a positive voltage. As shown in FIG. 4B, the flex vibration, based on high frequency voltages A and B, mutually cancel out, and points Y1 and Z1 on the vibration motor 10 have an amplitude of 0. As shown in FIG. 4C, the expansion and contraction vibration based on high frequency voltages A and B are in the direction of expansion. As indicated by the arrows, the points Y2 and Z2 are at maximum expansion, centered on joint X. As a result, as shown in FIG. 4D, both amplitudes are compounded, the synthesis of the movement of the points Y1 and Y2 is the movement of a point Y, while the synthesis of the movements of points Z1 and Z2 is the movement of point Z.

At time $t_2$, the high frequency voltage B becomes 0, and high frequency voltage A is a positive voltage. Flex vibration is produced by the high frequency voltage A, and the point Y1 oscillates in the negative direction, while the point Z1 oscillates in the positive direction. Expansion and contraction movement is generated by the high frequency voltage A causing the points Y2 and Z2 to contract with respect to time $t_1$. As a result, both of the vibrations are combined, and the points Y and Z move counter-clockwise with respect to time $t_1$.

At time $t_3$, the high frequency voltage A produces a positive voltage, and the high frequency voltage B produces an equal negative voltage. The flex movement is combined and amplified by the high frequency voltages A and B, such that the point Y1 is amplified in the negative direction and reaches the maximum negative oscillation value. The point Z1 oscillates in the positive direction, and reaches the maximum positive oscillation value. The expansion and contraction movement, based on the high frequency voltages A and B, cancel each other out causing the points Y2 and Z2 to return to their original positions. As a result, both the vibrations are combined and the points Y and Z move counter-clockwise.

At time $t_4$, the high frequency voltage A becomes 0, and the high frequency voltage B becomes a negative voltage. Flex movement is produced by the high frequency voltage B and the amplitude of the point Y1 and Z1 drops lower. Expansion and contraction movement is produced by the high frequency voltage B causing the points Y2 and Z2 to contract. As a result, both the vibrations are combined, and the points Y and Z move further counter-clockwise than at time $t_3$.

At time $t_5$, the high frequency voltage A produces a negative voltage, and the high frequency voltage B produces a negative voltage. The flex movement caused by the high frequency voltages A and B mutually cancel each other out, and the amplitude of the points Y1 and Z1 is 0. The expansion and contraction movement caused by the high frequency voltages A and B are produced in the contraction direction. As indicated by the arrows (in FIG. 4C), the points Y2 and Z2 reach the maximum contraction centered on joint X. As a result, both the vibrations are combined, and the points Y and Z move counter-clockwise.

The changes at time $t_6$ through time $t_9$ are the same as described above. As a result, as indicated in FIG. 4(D), the point Y and the point Z move counter-clockwise in an elliptical fashion.

This vibration motor 10 produces elliptical movement on the front ends of the drive force take-off members 14a through 14d, thereby producing a drive force. Consequently, when pressing the front end of the drive force take-off members 14 through 14d onto a fixed part (not shown), the elastic member 11 self-advances in relation to the fixed part.

Because the determination of adhesion position for the piezoelectric elements 15a through 15d in relation to the elastic body 11 is simple, not only are excitation discrepancies reduced, but also a left-right difference (the difference in velocity in the +X direction, -X direction, +Y direction, and -Y direction) is reduced. In accordance with the first preferred embodiment, an image blur suppression device is configured by using a vibration motor 10 to actuate an image blur suppression optical system of a camera.

Figure 5:
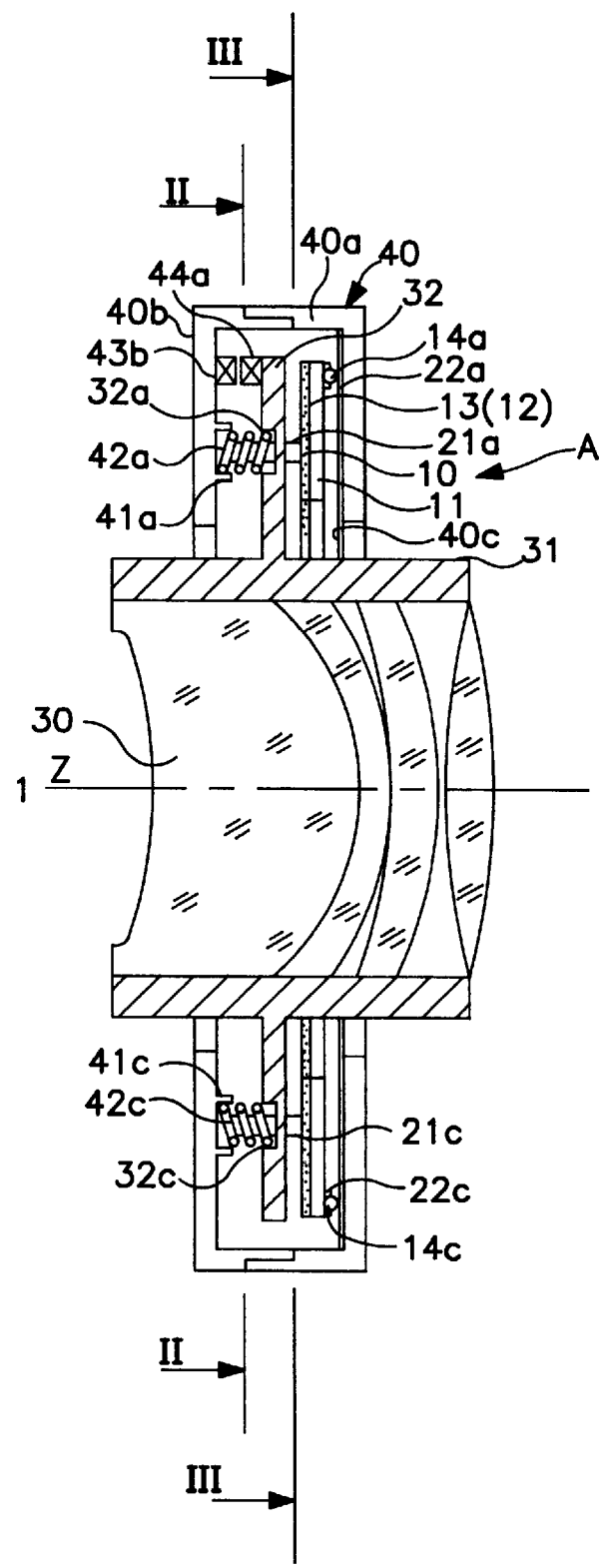
FIG. 5 is a cross-sectional diagram of an image blur suppression device in accordance with the preferred first embodiment of the present invention.
Figure 6:
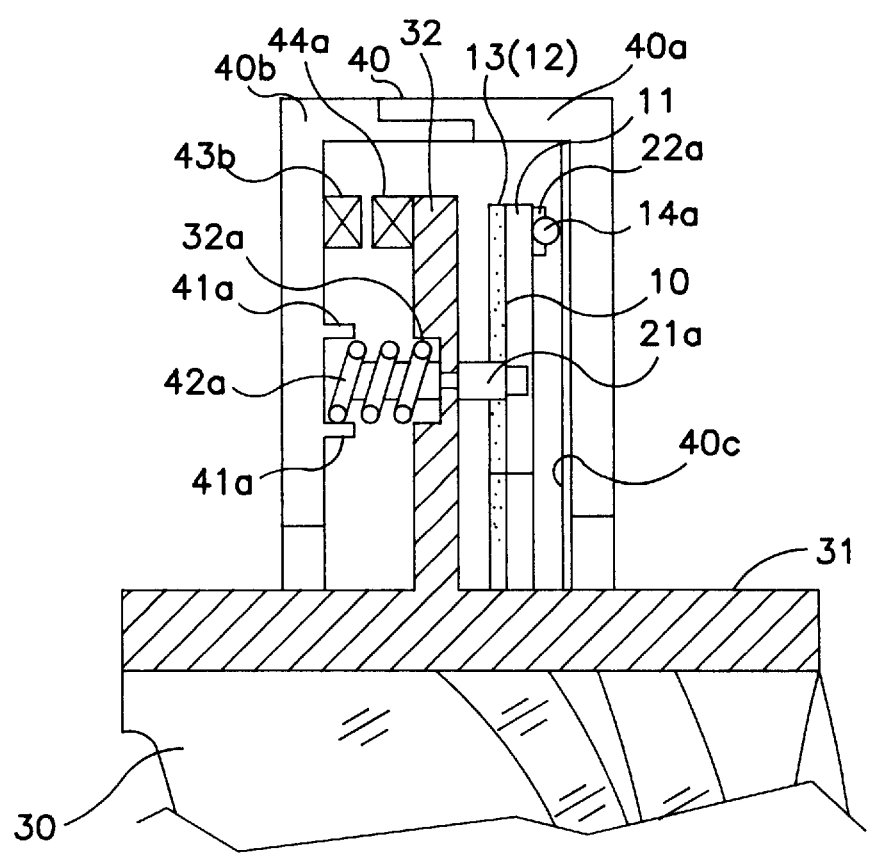
FIG. 6 is a cross-sectional diagram of part A in FIG. 5.
Figure 7:
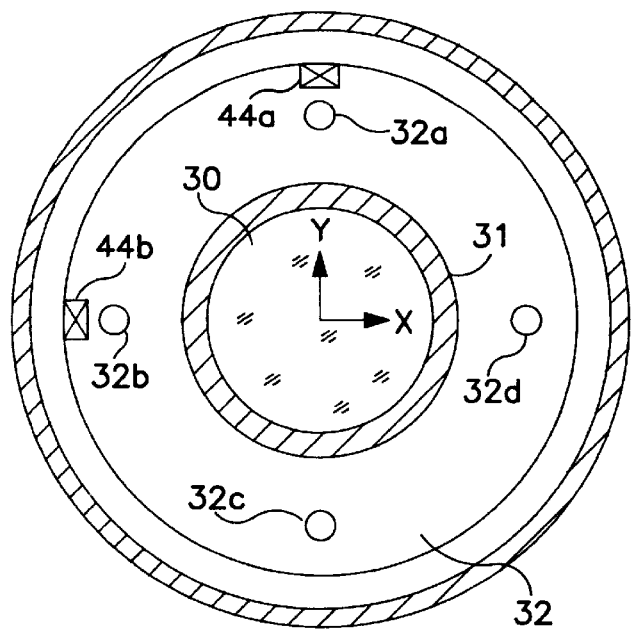
FIG. 7 is a cross-sectional diagram of FIG. 5 taken along line II—II.
Figure 8:
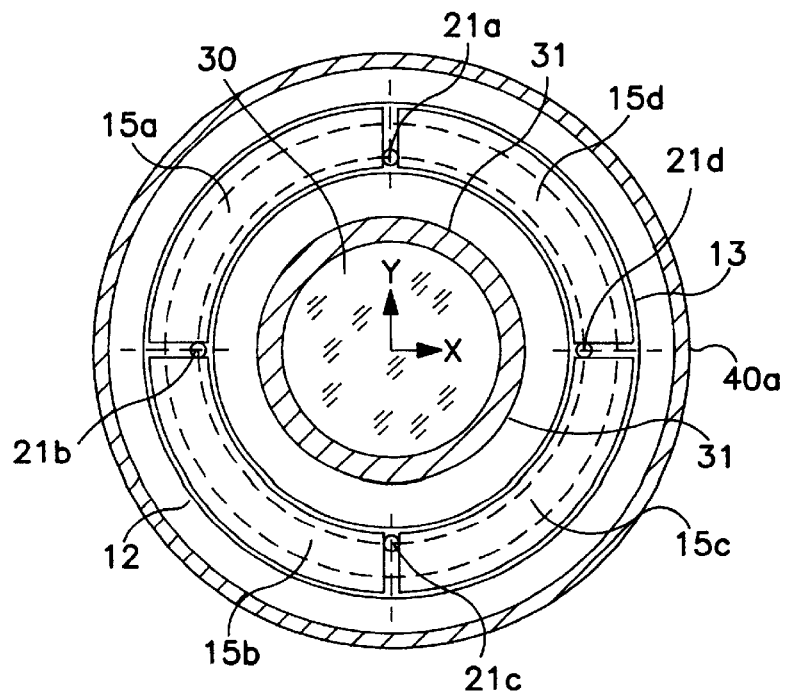
FIG. 8 is a cross-sectional diagram of FIG. 5 taken along line III—III.

FIG. 5 is a cross-sectional diagram of an image blur suppression device in accordance with the first preferred embodiment. FIG. 6 is a diagram of part A in FIG. 5. FIG. 7 is a cross-sectional diagram of FIG. 5 taken along line II—II. FIG. 8 is a cross-sectional diagram of FIG. 5 taken along line III—III.

In FIG. 5 and FIG. 6, a lens frame 31, supports an image blur suppression optical system 30, a ring-shaped vibration motor 10. The lens frame 30 is installed in the interior of a ring-shaped case 40 having a cross-sectional grove. The image blur suppression optical system 30 is supported by the cylindrical lens frame 31, and because the lens frame 31 freely moves in relation to the case 40, the image blur optical system 30 moves freely in a plane orthogonal to an optical axis Z of a main optical system (not shown). A flange part 32 protrudes out in a ring-shape on the outer surface of the lens frame 31. On one surface of the flange part 32 connecting rods 21a, 21b, 21c, and 21d (only 21a and 21c are shown; see FIG. 8) are, for example, screwed in, facing the optical axis direction at 0°, 90°, 180°, and 270°. The piezoelectric elements 12 and 13 of the ring-shaped vibration motor 10, are screwed into the other ends of connecting rods 21a, 21b, 21c, and 21d such that the mounting surface faces the flange part 32.

Cubic drive force take off part assembly bases 22a, 22b, 22c, and 22d (only bases 22a and 22c are shown) which, for example, are made of ceramic, and are the outer edge parts of the other surface of elastic body 11. The cubic drive force take off part assembly bases 22a, 22b, 22c and 22d are installed, for example, using adhesives at positions of 0°, 90°, 180°, and 270°.

The drive force take-off members 14a, 14b, 14c, and 14d are moving feet composing, for example, of nitride balls, and are attached with adhesives onto the drive force take off assembly bases 22a, 22b, 22c, and 22d. The drive force take-off members 14a, 14b, 14c, and 14d produce highly efficient elliptical movement because they are provided in positions in the middle of the longitudinal vibration produced by elastic member 11. The drive force take-off members 14a, 14b, 14c and 14d produce elliptical movement with as little interference as possible to the movement of elastic body 11 in the X direction and the Y direction because of the curved surfaces.

The case 40 comprises a hollow circular plate shaped bottom part 40a having a flange part extending to the outer edge; a hollow circular plate-shaped cover part 40b with a flange part that mates with the flange part of 40a. The bottom part 40a and the cover part 40b can be freely attached and detached at mating parts which are respectively provided on the ends of the respective flange parts.

An inner bottom surface of the bottom part 40a is a slide surface 40c facing the vibration motor 10. Slide material 45c made, for example, of polyflurocarbon is provided on the slide surface 40c and provides a sliding surface for the drive force take-off members 14a, 14b, 14c, and 14d. The inner surface of cover part 40b is provided with circular grove shaped spring assembly parts 41a, 41b, 41c, and 41d in a position facing spring retention holes 32a, 32b, 32c, and 32d (only 32a and 32c are shown in FIGS. 5 and 6; see FIG. 7). The spring retention holes 32a, 23b, 32c and 32d are provided on the flange part 32 of the lens frame 31 at 0°, 90°, 180°, and 270°.

The lens frame 31 is arranged on the inner bottom surface of bottom part 40a. The cover part 40b is mounted on bottom part 40a such that four springs 42a, 42b, 42c, and 42d (only 42a and 42c are shown) are placed between the spring retention holes 32a, 32b, 32c, and 32d and spring assembly parts 41a, 41b, 41c, and 41d (only 42a and 42c are shown). The springs 42a–42d acts as biasing or energizing means.

The flange part 32 is biased by the springs 42a, 42b, 42c, and 42d. The vibration motor 10 is biased toward slide surface 40c by the connecting rods 21a–21d. The vibration motor 10 is arranged such that the lens frame 31 can freely move in two dimensions on a plane orthogonal to the optical axis Z. Moreover, the vibration motor 10 is compactly arranged around the lens frame 31 because the vibration motor 10 is hollow and provides an opening to house the lens frame 31.

Light projectors 43a and 43b (preferably infrared emitting diodes; IRED), and light receivers 44a and 44b (preferably semi-conductor position detecting elements; PSD) are positioned at a 90° interval on the outer edge of the inner surface of the cover part 40b and of one of the surfaces of the flange part 32. The light projectors 43a and 43b along with the light receivers 44a and 44b (see FIG. 7) comprise lens position detection sensors for detecting the amount of movement of the lens frame 31 in relationship to the case 40, in both the Y direction and the X direction.

Figure 9:
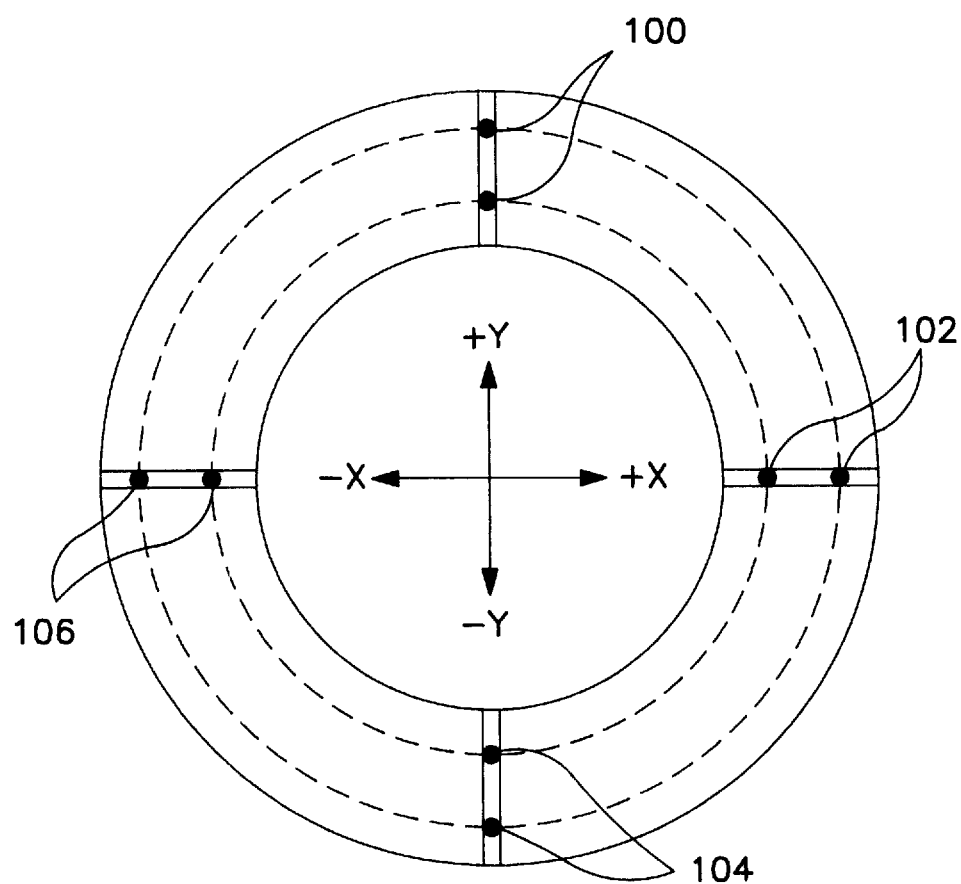
FIG. 9 is a diagram of the respective joint intersection positions of $B_{21}$ vibration mode $B_{21X}$ and $B_{21Y}$ when moving respectively in the X direction and Y direction.

FIG. 9 shows the joint intersection positions of $B_{21}$ vibration mode $B_{21X}$, $B_{21Y}$ when moving respectively in the X direction (points 100 and 104) and in the Y direction (points 102 and 106). It is preferable that the connecting rods 21a, 21b, 21c, and 21d be installed at the joint intersection positions, 100, 102, 104 and 106, preferably in a position facing the four joint intersection positions on the inner diameter side.

Figure 10:
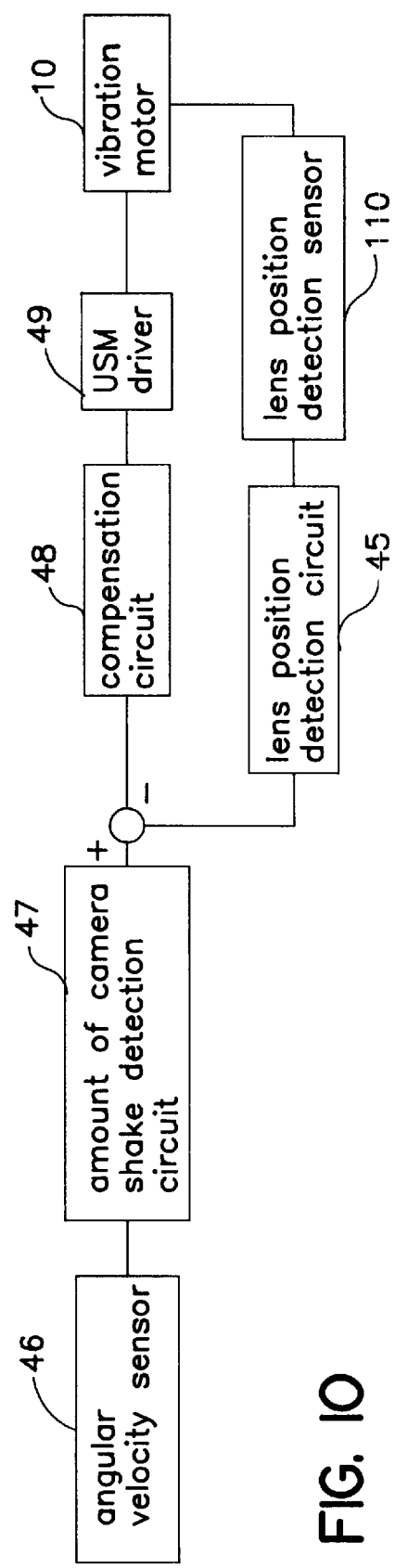
FIG. 10 is a block diagram of a control circuit for an image blur suppression device in accordance with the first preferred embodiment of the present invention.

FIG. 10 is a block diagram of a control circuit of the image blur suppression device in accordance with the first preferred embodiment of the present invention. The optical axis Z position of the image blur suppression optical system 30 is detected by the light projectors 43a and 43b, the light receivers 44a and 44b, (comprising a lens position detection sensor 110) and a lens position detection circuit 45. The optical axis z position of the image blur suppression optical system 30 is compared, in a compensation circuit 48 with information obtained from an angular velocity sensor 46, which detects vibrations of the image blur suppression device in the main camera body, and from information obtained by an amount of camera shake detection circuit 47. Image blur is prevented by: outputting from the USM driver 49 movement axis command signals which specify either the X direction or Y direction along with movement direction forward or backward command signals to specify the direction of movements to a vibration motor 10. Subsequent feedback is used to control the movement of the image blur suppression optical system 30 so as to correspond to the image blur produced by camera shake. The vibration motor 10 is controlled to shift the lens frame 31 in a direction opposite to the direction of vibration. Thus, a transmission gear array and an electro-magnetic motor are not necessary. Large scale, heavy, complicated and noisy devices of the prior art are avoided. The responsiveness of the image blur suppression device, in particular, the start-up responsiveness is fundamentally improved.

Although the first embodiment of the present invention has been described with respect to a specific configuration, it will be recognized that the first embodiment is not limited to the specific configuration.

Figure 11:
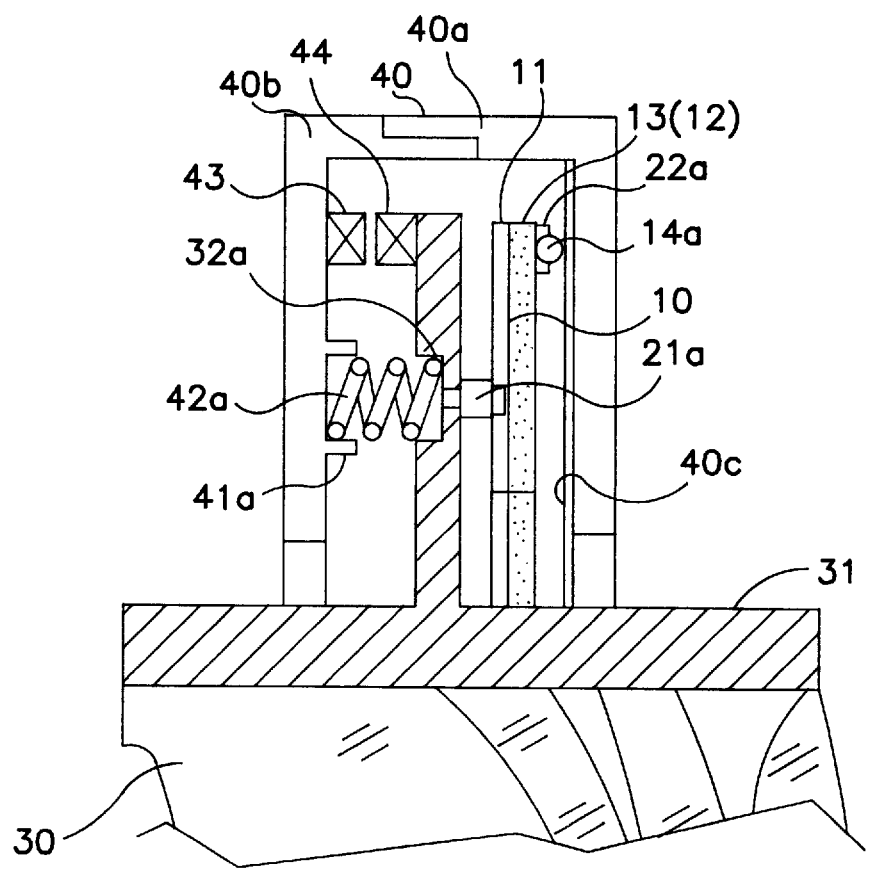
FIG. 11 is a cross-sectional diagram of an image blur suppression device in accordance with a second preferred embodiment of the present invention.

FIG. 11 is a cross-sectional diagram an image blur suppression device in accordance with the second preferred embodiment of the present invention.

Piezoelectric elements 12 and 13 are affixed, for example, by adhesives, to a surface opposite the surface used in the first embodiment. The vibration motor 10 is positioned such that lens frame 31 freely moves in an orthogonal plane to optical axis Z. In accordance with the first preferred embodiment, through holes for connecting rods 21a, 21b, 21c, and 21d were provided on the surfaces of piezoelectric elements 12 and 13, however, in accordance with the second preferred embodiment, connecting rods are not necessary. Thus, the number of processing pieces of piezoelectric elements 12 and 13 can be reduced, the surface area of piezoelectric elements 12 and 13 can be expanded, and the resulting drive force is improved.

Although the second embodiment of the present invention has been described with respect to a specific configuration, it will be recognized that the second embodiment is not limited to the specific configuration.

Figure 12:
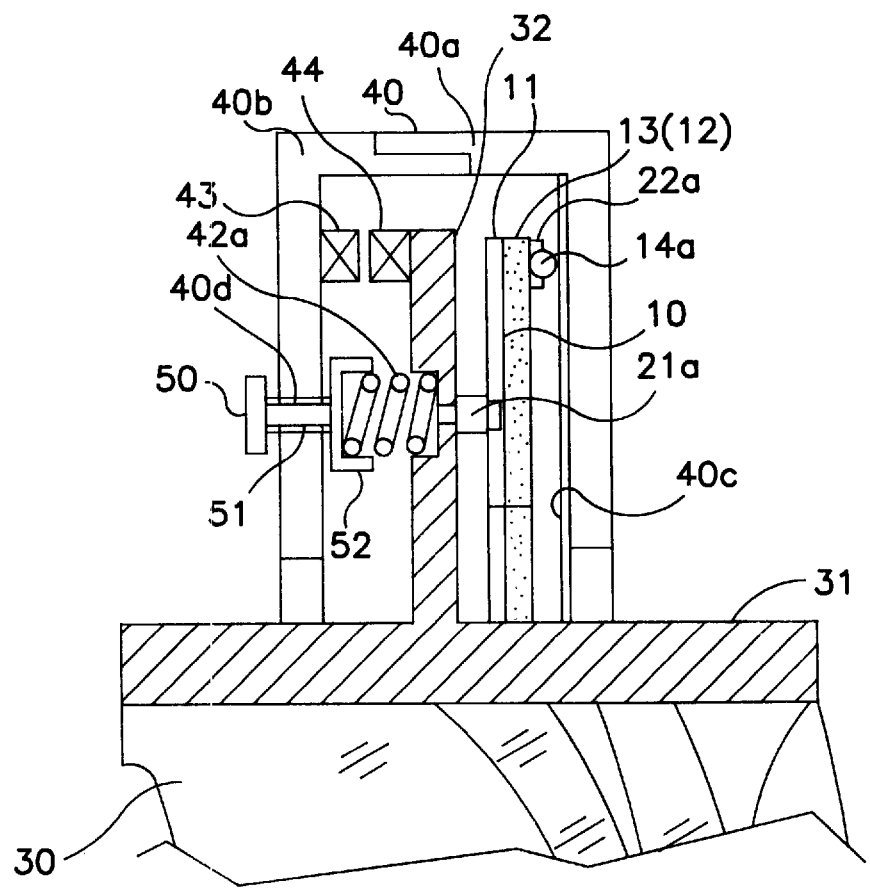
FIG. 12 is a cross-sectional diagram of an image blur suppression device in accordance with a third embodiment of the present invention.

FIG. 12 is a cross-sectional diagram of an image blur suppression device in accordance with the third preferred embodiment of the present invention. Springs 42a–42d, which are the biasing mechanism to bias the vibration motor 10 against the slide material 40c, are supported by a bolt 50 (four such bolts are provided). The bolt 50 have a screw part 51 (four such screw parts are provided), and are screwed into a screw hole 40d (four such screw holes are provided) on the cover part 40b. A pressure plate 52d is provided on the ends of each of the screw parts 51 so as to adjustably pressurize spring 42.

Because the drive force (movement velocity) varies depending on the size of the pressurizing force, the vibration motor is adjustable by rotating the bolts 50 before or during use. Movement velocity irregularities in the ±x direction or ±y direction caused by, for example (1) adhesion position discrepancies of the piezoelectric elements 12 and 13, (2) shape inadequacies of the elastic member 11 caused by processing imprecision, and (3) insufficient contract caused by abrasion between the drive force take-off members 14a–14d and the slide material 40c can be compensated for.

Although the third embodiment of the present invention has been described with respect to a specific configuration, it will be recognized that the second embodiment is not limited to the specific configuration.

Figure 13:
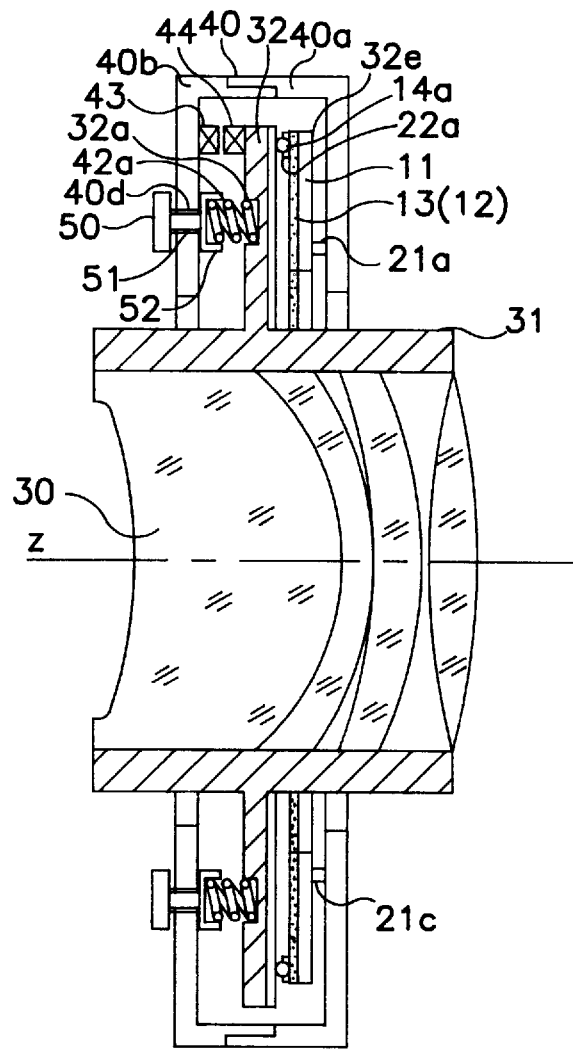
FIG. 13 is a cross-sectional diagram of an image blur suppression device in accordance with a fourth embodiment of the present invention.

FIG. 13 is a cross-sectional diagram of an image blur suppression device in accordance with a fourth preferred embodiment of the present invention. The vibration motor 10 is secured to the lens frame 31 through the flange part 32. However, the vibration motor 10 is secured to the case 40 such that relative movement is conducted between the vibration motor 10 and the lens frame 31.

Slide material 32e is mounted, for example, using adhesives, on the opposite surface of flange part 32 of the lens frame 31, as compared with the previous embodiments. The drive force take-off members 14a–14d of the vibration motor 10 are secured through the connecting rods 21a–21d, which in turn are secured to the bottom part 40a of the case 40. The drive force take-off members 14a–14d contact the slide material 32e. The flange part 32a is pressurized to a suitable pressure by the spring 42 and the bolt 50.

In accordance with the fourth preferred embodiment of the present invention, the weight of the entire movement system is reduced, and the inertia accompanying movement is reduced. Consequently, the error in the amount of movement can be reduced and start-up responsiveness during activation is improved.

Although the fourth embodiment of the present invention has been described with respect to a specific configuration, it will be recognized that the fourth embodiment is not limited to the specific configuration.

Figure 14:
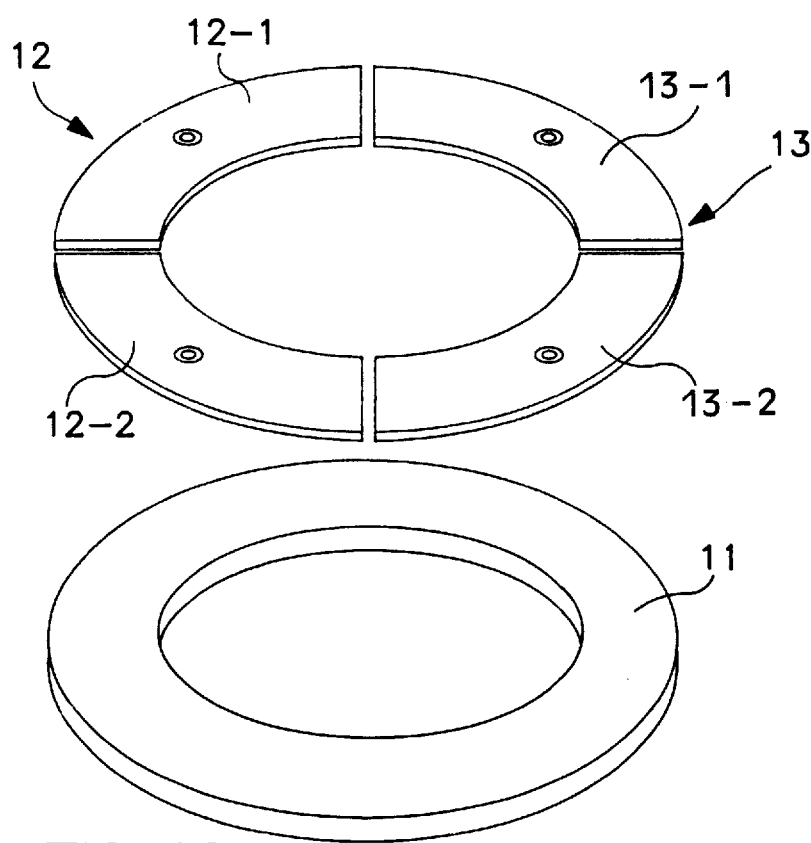
FIG. 14 is a perspective view of a vibration motor in accordance with a fifth preferred embodiment of the present invention.

FIG. 14 is a perspective view diagram indicating vibration motor in accordance with a fifth preferred embodiment of the present invention. The piezoelectric elements 12 and 13 are split into piezoelectric elements 12-1, 12-2, 13-1, and 13-2. Compared to vibration motor 10 in accordance with the first preferred embodiment, the electrode plates 15a–15d are unnecessary, the structure can be simplified, and the cost of manufacturing reduced.

Although the fifth embodiment of the present invention has been described with respect to a specific configuration, it will be recognized that the fifth embodiment is not limited to the specific configuration.

Figure 15:
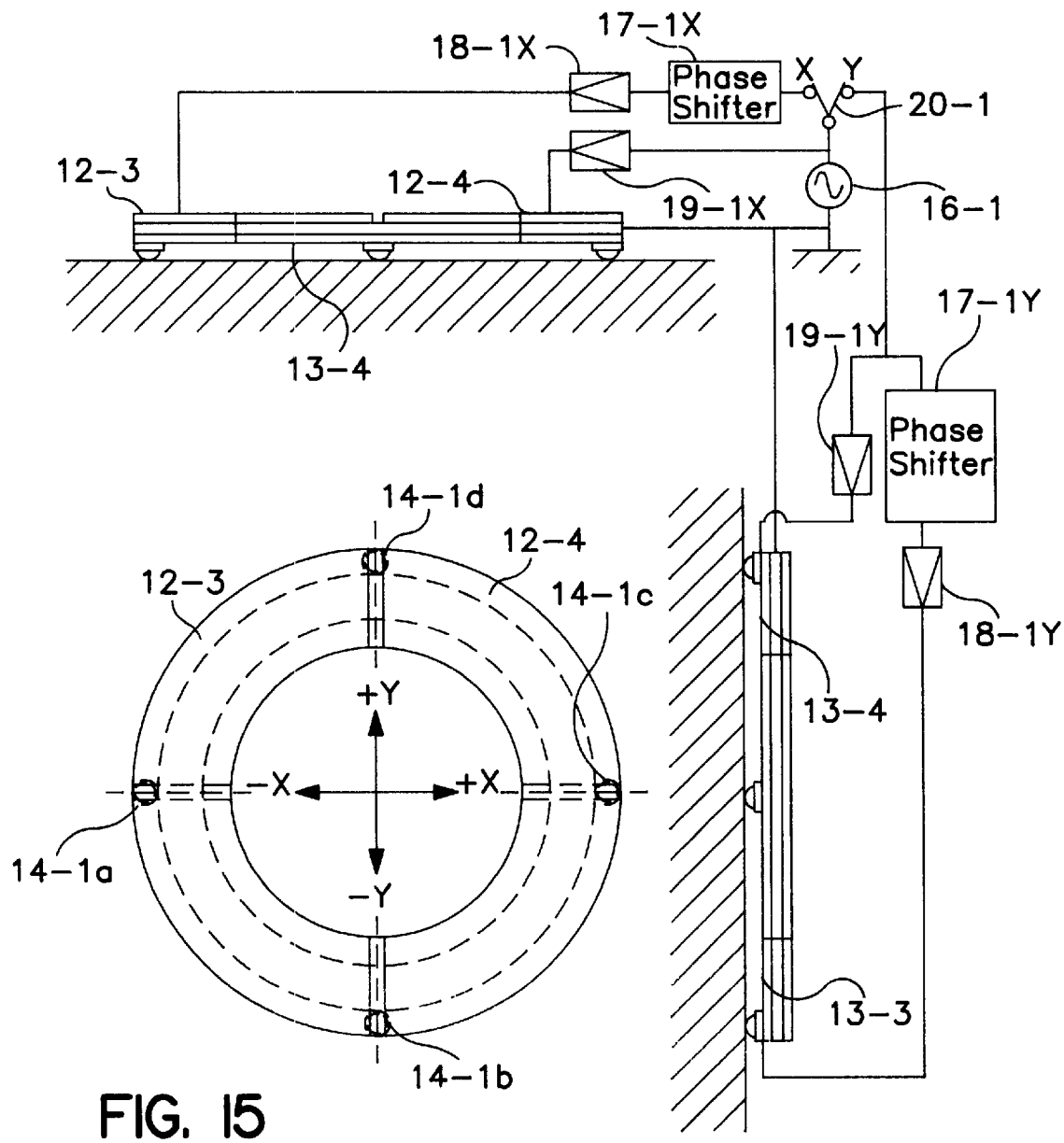
FIG. 15 is a schematic diagram of a vibration motor in accordance with a fifth preferred embodiment of the present invention.
Figure 16:
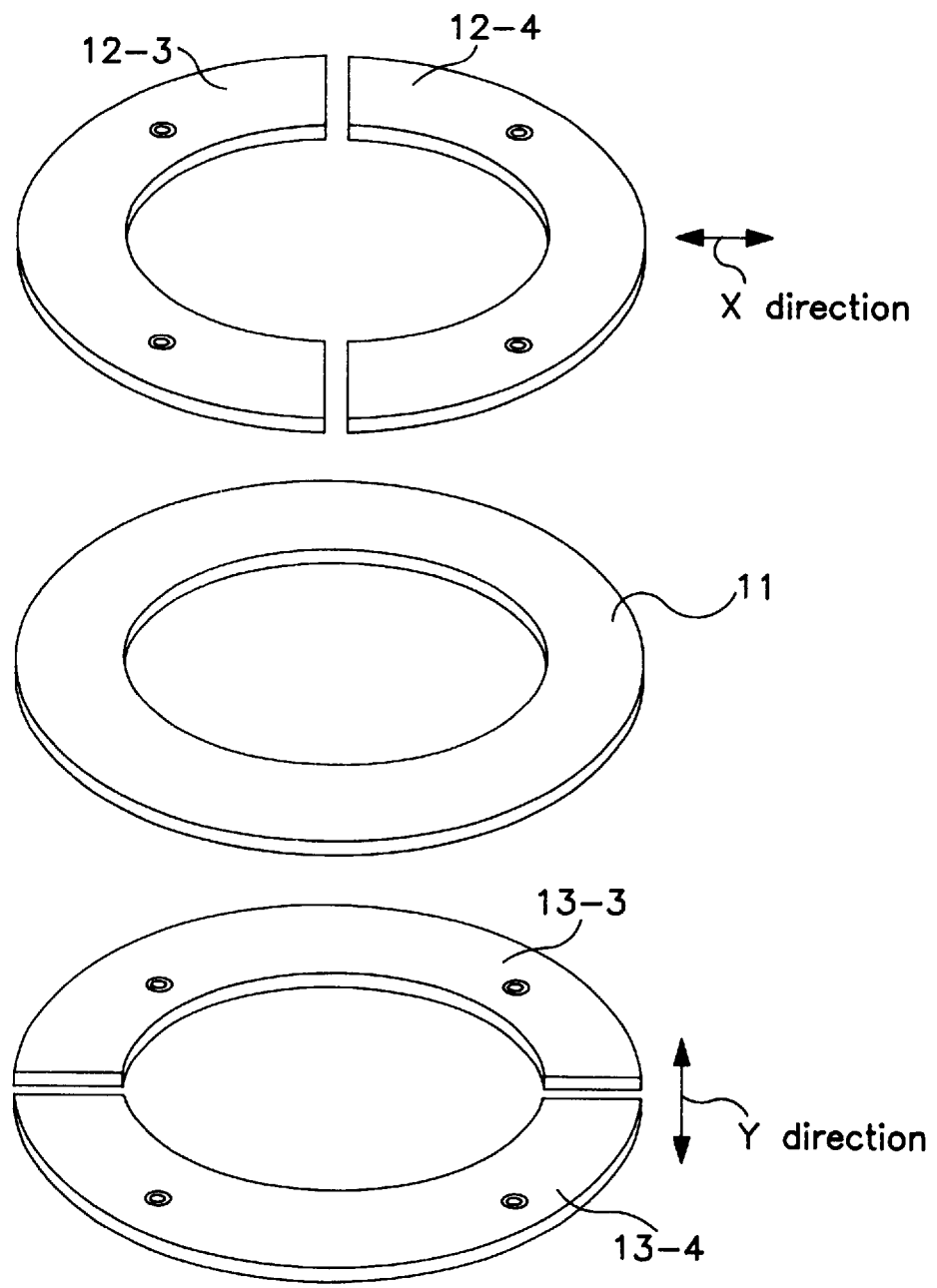
FIG. 16 is a perspective view of piezoelectric elements accordance with a sixth preferred embodiment of the present invention.
Figure 17A:
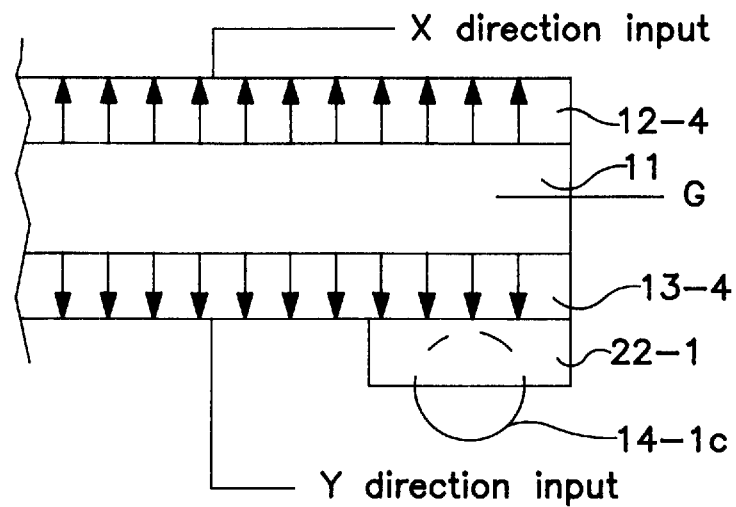
FIGS. 17A and 17B are diagrams of drive force take-off members in accordance with the sixth preferred embodiment of the present invention.
Figure 17B:
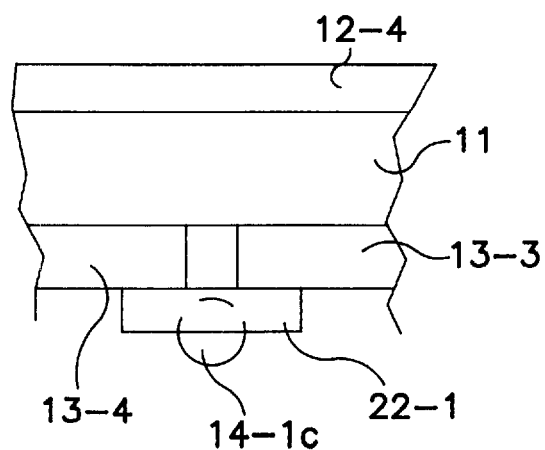

FIGS. 15–18 are diagrams of a vibration motor in accordance with a sixth preferred embodiment of the present invention. FIG. 15 is a schematic showing an overall configuration. FIG. 16 is a perspective diagram of the piezoelectric elements. FIGS. 17 and 18 show arrangements of the drive force take-off members.

In accordance with the sixth preferred embodiment of the present invention, the piezoelectric element is split into four parts, grouped for X direction use and Y direction use, and switched as groups. Further, separate piezoelectric elements are provided for the X direction and the Y direction on both sides of elastic member 11. Piezoelectric elements 12-3 and 12-4 for the X direction are arranged on the upper surface of elastic member 11, and piezoelectric elements 13-3 and 13-4 (see FIG. 16) for the Y direction are arranged on the lower surface of elastic member 11. High frequency signals from an oscillator 16-1 of a drive circuit pass through a transfer switch 20-1 to a drive circuit for the X direction (phase shifter 17-1X, amplifiers 18-1X and 19-1X) and a drive circuit for the Y direction (phase shifter 17-1Y, amplifiers 18-1Y and 19-1Y). The amplifiers 13-1X, 18-1Y, 19-1X, 19-1Y are connected to the piezoelectric elements 12-3, 12-4, 13-3, 13-4 through the transfer switch 20-1.

When the contract points of the transfer switch 20-1 are switched to the X side (as shown by the solid lines in FIG. 15), the output of the amplifier 18-1X is connected to the piezoelectric element 12-3, and the output of the amplifier 19-1X is connected to the piezoelectric element 12-4. In this state, the unit can move in the X direction. When the contract point of the transfer switch 20-1 is switched to the Y side (shown by the dotted lines in FIG. 15), the output of the amplifier 18-1Y is connected to the piezoelectric element 13-3, and the output of the amplifier 19-1Y is connected to the piezoelectric element 13-4. In this state, the unit can move in the Y direction.

Figure 18A:
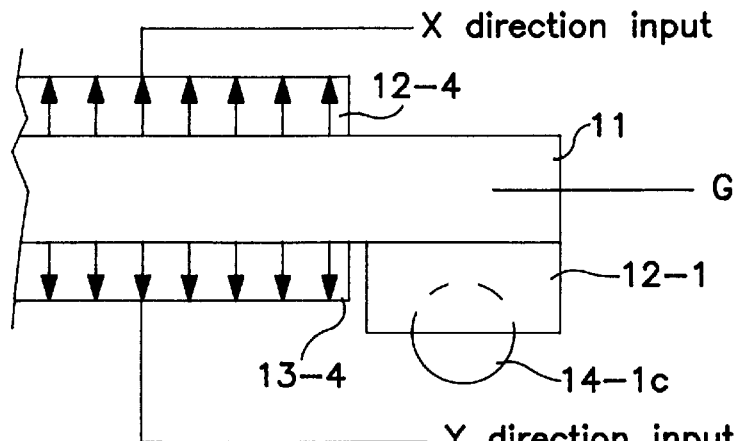
FIGS. 18A–18D are diagrams of drive force take-off members in accordance with the sixth preferred embodiment of the present invention.
Figure 18B:
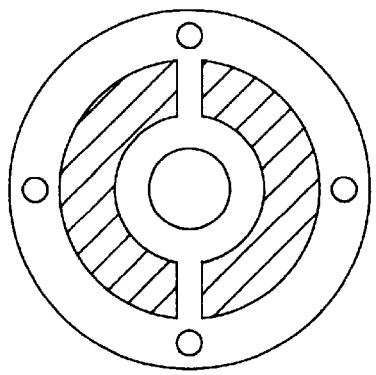
Figure 18D:
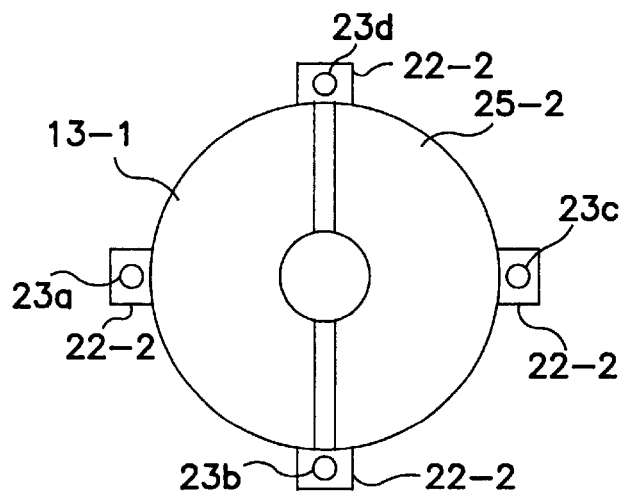
Figure 18C:
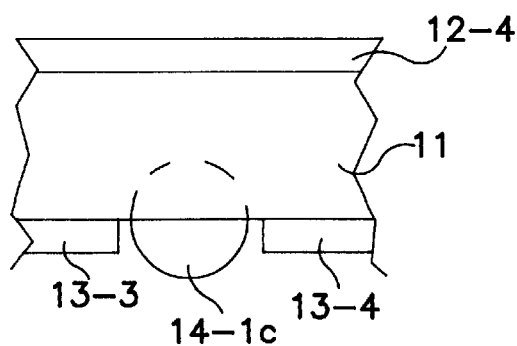

As the piezoelectric elements 13-3 and 13-4 are provided on the lower surface of the elastic member 11, drive force take-off members 14-1a to 14-1d straddle the piezoelectric elements 13-3 and 13-4. For this reason, the drive force take-off members 14-1a to 14-1d are attached to drive force take off part attachment bases 22-1 (see FIGS. 17A and 17B) which are made of an insulating material such as fine ceramics. The drive force take-off members 14-1a to 14-1d may also be directly attached to the elastic member 11 by providing the piezoelectric elements 13-3 and 13-4 with a small radii equal to the width of the attachment base 12-1, as indicated in FIGS. 18A and 18B. The gap between the piezoelectric elements 13-3 and 134 may also be wider than the size of the drive force take-off member 14-1c, as indicated in FIG. 18C. In addition, the drive force take-off members 23a–23d may be attached to the drive force take-off member 22-2 by extending the drive force take off part attachment base 22-2 to the outside of the elastic member 11 as indicated in FIG. 18D.

In the image blur suppression device in accordance with the sixth preferred embodiment of the present invention, multiple piezoelectric elements are used, such that piezoelectric element groups can have a configuration having a little unevenness for each sector by selecting elements which have equal polarity states.

Although the sixth embodiment of the present invention has been described with respect to a specific configuration, it will be recognized that the sixth embodiment is not limited to the specific configuration.

Figure 19:
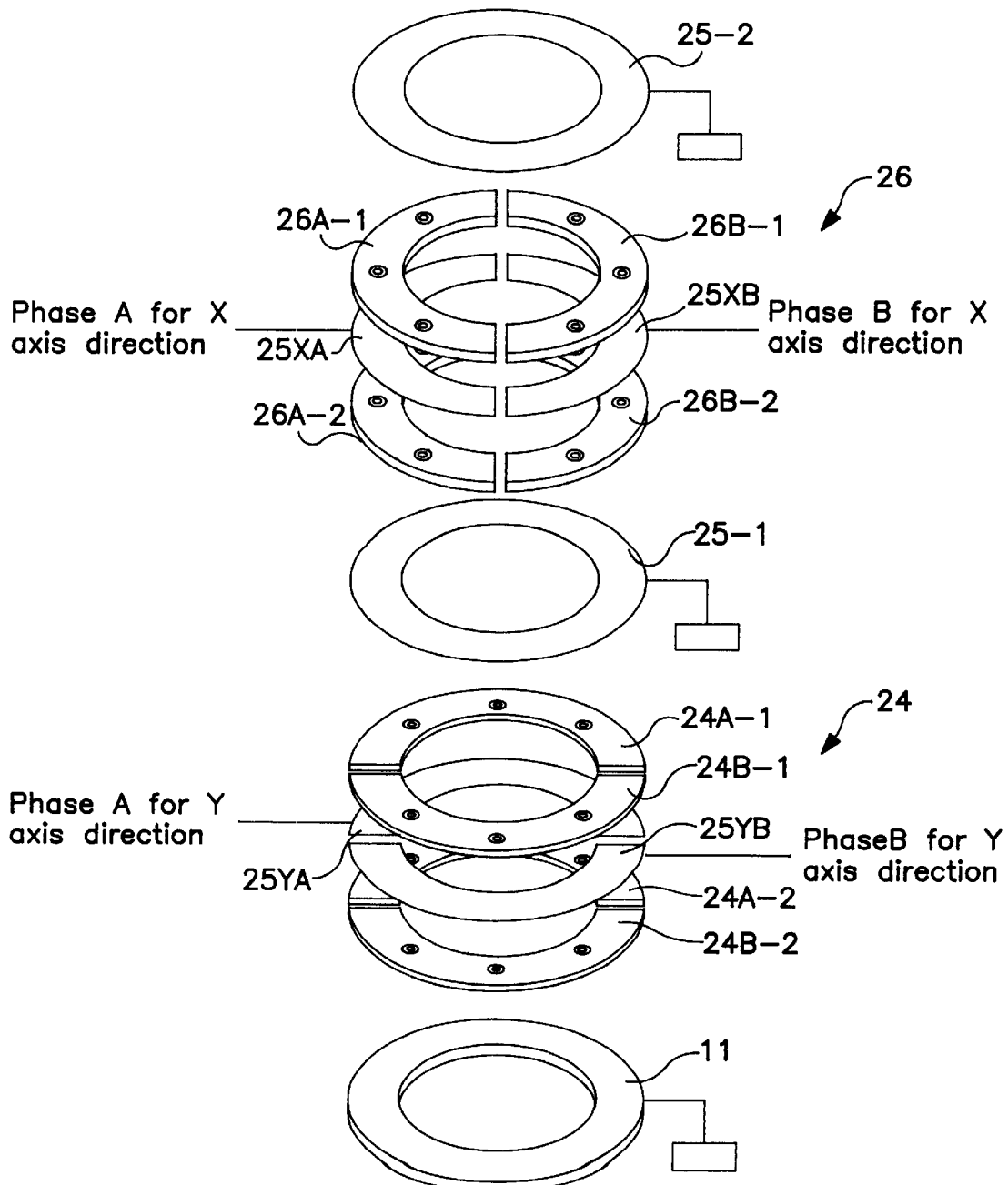
FIG. 19 is a perspective view of piezoelectric elements of a vibration motor in accordance with a seventh embodiment of the present invention.
Figure 20:
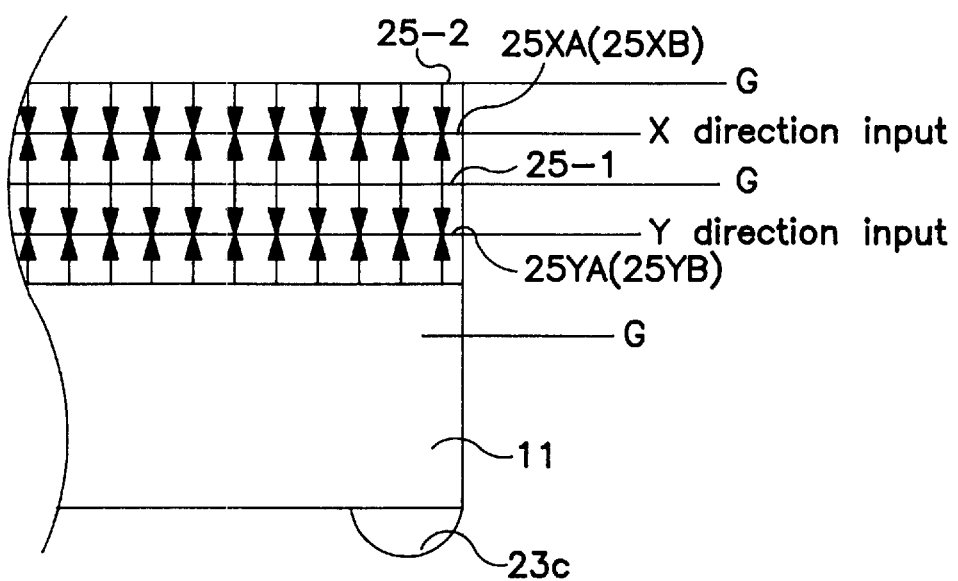
FIG. 20 is a partially expanded diagram of FIG. 19.

FIG. 19 and FIG. 20 are diagrams showing additional embodiments of vibration motors in accordance with a seventh preferred embodiment of the present invention. FIG. 19 is a perspective view of piezoelectric elements of a vibration motor in accordance with the seventh preferred embodiment. FIG. 20 is a partially expanded view of FIG. 19. In general, piezoelectric elements for the X direction and for the Y direction are laminated and arranged on the top side of the elastic member 11.

A piezoelectric element 24 (for the Y direction) is joined to the upper surface of the elastic member 11. The piezoelectric element 24 is laminated by inserting copper electrode plates 25YA and 25YB between piezoelectric materials 24A-1 and 24B-1 and piezoelectric materials 24A-2 and 24B-2. Moreover, a piezoelectric element 26 (for the X direction) is joined on top of the piezoelectric element 24 (for the Y direction) through electrode 25-1. The piezoelectric element 26 is laminated by inserting electrode plates 25XA and 25XB with piezoelectric material 26A-1 and 26B-1 and piezoelectric materials 26A-2 and 26B-2. An electrode plate 25-2 is joined on top of the piezoelectric material 26A- and 26B-1.

FIG. 20 shows the directions of polarity of the piezoelectric material. The input for the X direction and the input for the Y direction are connected to the electrode plates 25XA and 25XB and the electrode plates 25YA and 25Y, respectively. The electrode plates 25-1 and 25-2 and the elastic member 11 are connected to ground.

According to the seventh preferred embodiment of the present invention, a large drive force can be obtained due to the many layers of piezoelectric materials.

Although the seventh embodiment of the present invention has been described with respect to a specific configuration, it will be recognized that the seventh embodiment is not limited to the specific configuration.

Figure 21A:
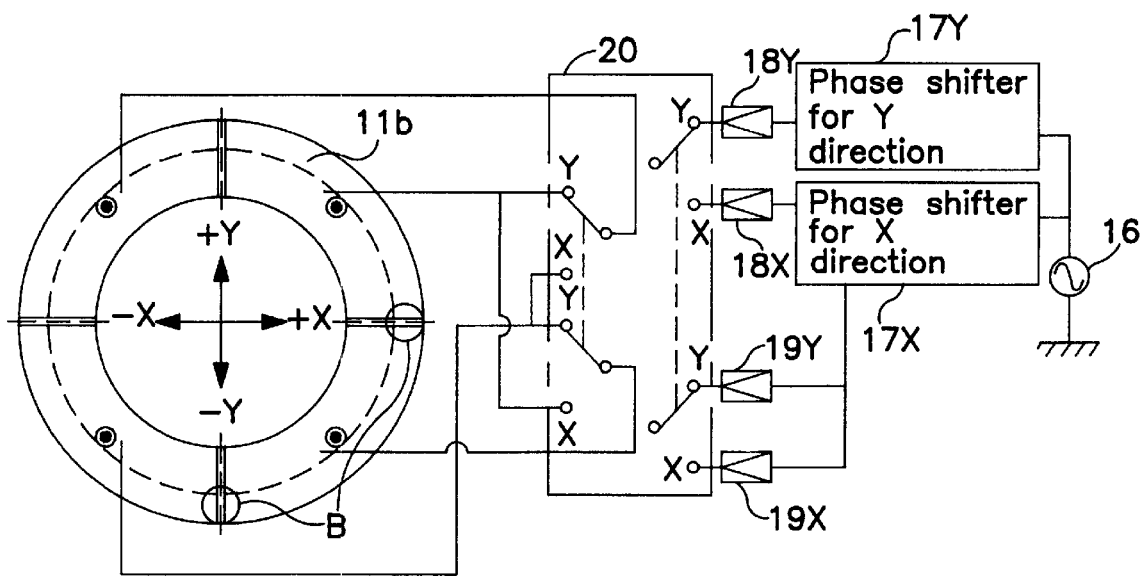
FIGS. 21A and 21B are schematics of a vibration motor in accordance with an eighth preferred embodiment of the present invention.
Figure 21B:
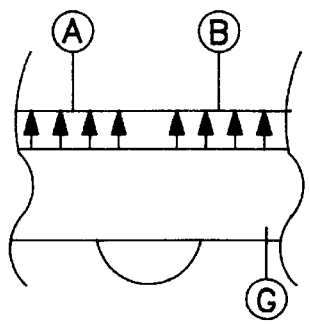

FIGS. 21A and 21B are schematic diagrams of a vibration motor in accordance with an eighth preferred embodiment of the present invention showing primary flex $R1$-$B_{11X}$-$B_{11Y}$. Joint 11b is shown in FIG. 21(A) during primary flex.

Compared to the cases of $R1$-$B_{21}$, and $R1$-$B_{21X}$-$B_{21Y}$ modes, in $R1$-$B_{11}$, and $R1$-$B_{11A}$-$B_{11Y}$ modes, the dimensions of the ringed shaped part of the elastic member become slightly thicker when the vibrations of the R1 mode and $B_{11}$ mode degenerate. Consequently, the vibration motor 11b in accordance with the eight preferred embodiment is used when it is desirable to make the inner diameter larger, in relation to the outer diameter, by restricting the dimensions incorporated in the drive subject. Specifically, when the eighth preferred embodiment is used, it is desirable to make the center part as large as possible.

Although the eighth embodiment of the present invention has been described with respect to a specific configuration, it will be recognized that the eighth embodiment is not limited to the specific configuration.

The first through eighth embodiments have ring-shaped elastic members, and utilize vibration motors which take off drive power by producing expansion and contraction movement and flex vibration in an elastic member. A ninth preferred embodiment of the present invention, and a tenth preferred embodiment, to be described later, have frame type elastic members, and utilize vibration motors which take off drive power by producing longitudinal vibration and flex vibration on the elastic member.

Figure 22:
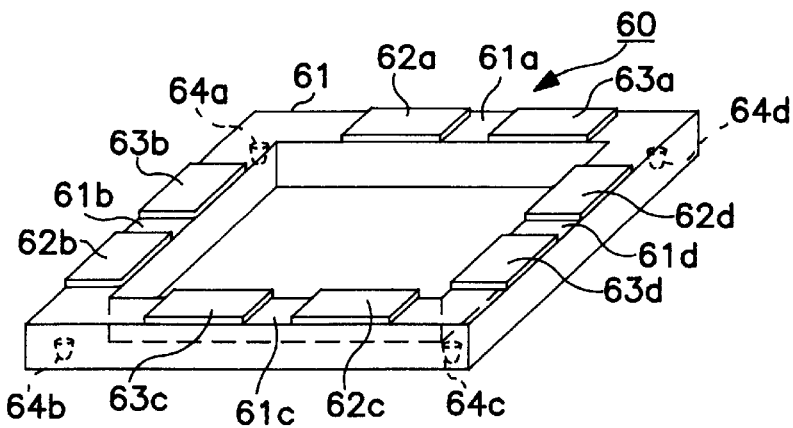
FIG. 22 is a perspective diagram of a vibration motor in accordance with a ninth preferred embodiment of the present invention.
Figure 25:
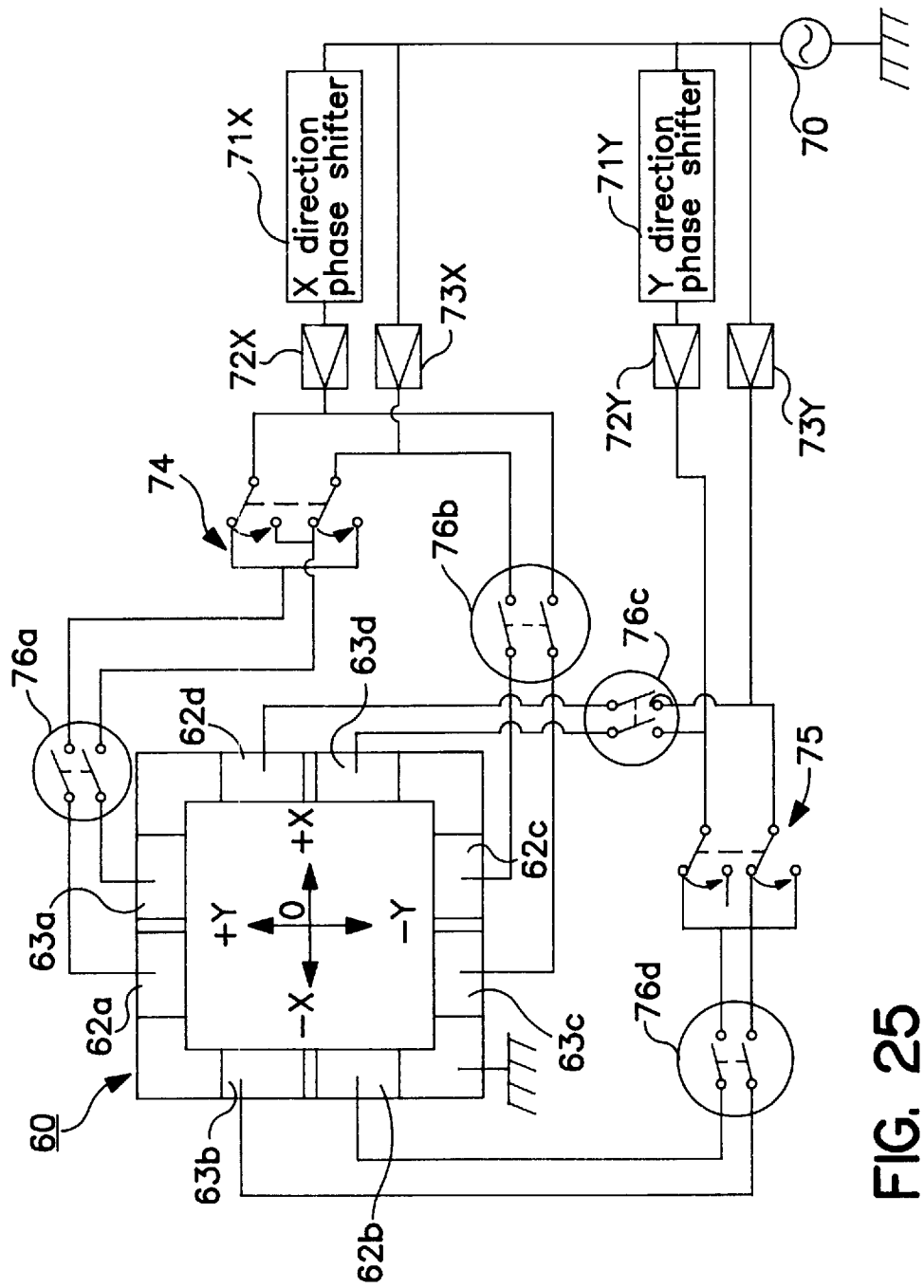
FIG. 25 is a block diagram of the electro-mechanical converting elements of a vibration motor in accordance with the ninth preferred embodiment of the present invention.
Figure 26:
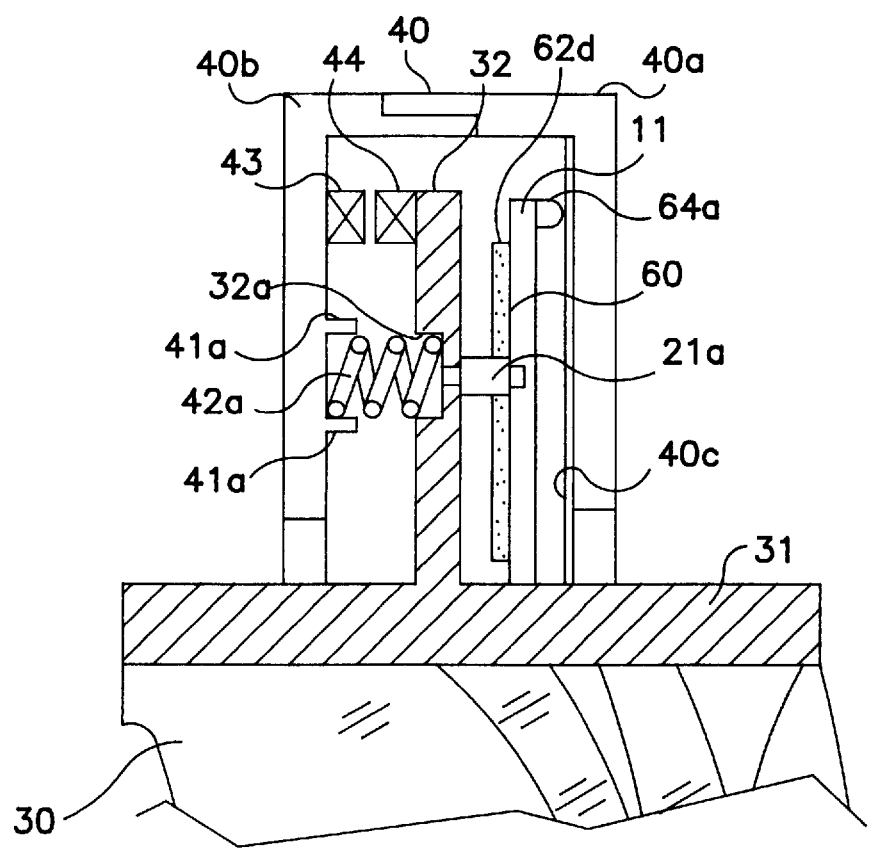
FIG. 26 is a cross-sectional diagram of an image blur suppression device in accordance with the ninth preferred embodiment of the present invention.

FIGS. 22 through 26 are diagrams showing a vibration motor in accordance with the ninth preferred embodiment of the present invention. FIG. 22 is a perspective diagram of the vibration motor. FIGS. 23A and 23B are plan views of the vibration motor. FIGS. 24A and 24B are diagrams of the operation of the vibration motor. FIG. 25 is a block diagram of electro-mechanical converting elements used in the vibration motor. FIG. 26 is a cross-sectional diagram of an image blur suppression device incorporating the vibration motor.

Figure 23A:
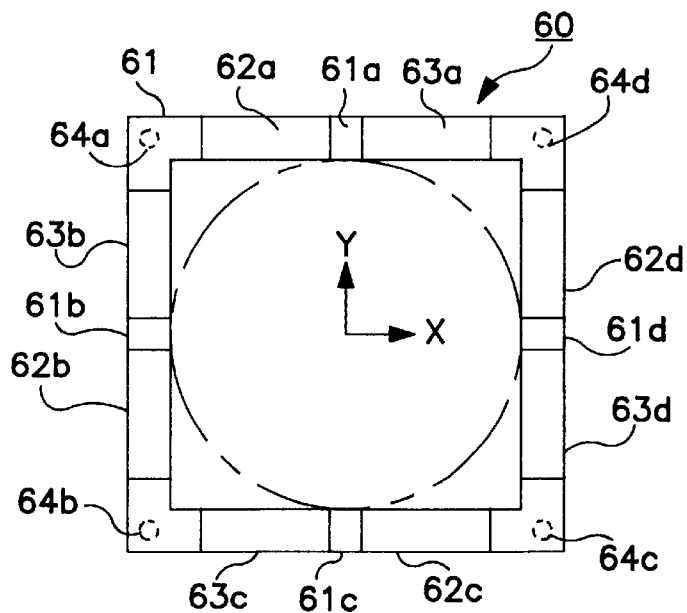
FIGS. 23A–23C are diagrams of a vibration motor in accordance with the ninth preferred embodiment of the present invention.
Figure 23C:
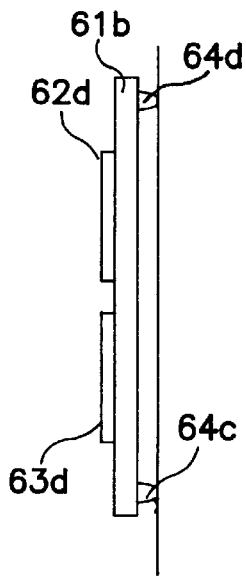
Figure 23B:
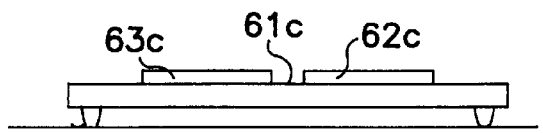

As shown in FIG. 22 and FIG. 23, a vibration motor 60 generally comprises: an elastic body 61 having a frame shape with an outer diameter in the shape of a regular quadrangle; piezoelectric elements 62a and 63a, 62b and 63b, 62c and 63c, and 62d and 63d joined to an upper surface of four side parts 61a, 61b, 61c and 61d at the elastic body 61; and drive force take-off members 64a, 64b, 64c and 64d installed near the vertices of the lower surface of the elastic member 61.

The elastic member 61 is an elastic member, having an external shape of a regular quadrangle frame plate, manufactured using elastic material such as metal or plastic. Because the elastic member 61 is frame shaped, it is easy, for example, to incorporate into a lens barrel. When the lens barrel is housed within the elastic member 61, the construction of a large scale device can be effectively controlled. An outline of a lens barrel incorporated in the elastic member 61 is indicated by the dotted line in FIG. 23A.

By applying drive voltage to piezoelectric elements 62a and 63a, 62b and 63b, 62c and 63c, and 62d and 63d a longitudinal vibration mode and a flex vibration mode are produced in the elastic member 61. Elliptical movement is produced by the synthetic movement of the longitudinal flex vibrations. It is important that the longitudinal vibration mode and the flex vibration mode agree as much as possible. For this reason, it is important to set the dimensions of the elastic member 61 based on the vibration modes produced by the four side parts 61a, 61d of the elastic member 61 as well as the resonance frequencies of each frame side member 61a, 61b, 61c, and 61d. The outer length, inner length and plate thickness, etc. for the frame side parts of the elastic member 61 must be selected based on the vibration modes and resonance frequency of the elastic member 60.

The piezoelectric elements 62a and 63a, 62b and 63b, 62c and 63c, 62d and 63d are mounted, using adhesives, on the four side parts 61a, 61b, 61c, and 61d of the elastic member 61. The piezoelectric elements are formed in a thin film shape using PZT, etc.

The piezoelectric elements 62a and 63a, 62b and 63b, 62c and 63c, and 62d and 63d are mutually arranged at fixed intervals on the four side parts 61a–61d. The piezoelectric elements 62a and 63a, 62b and 63b, 62c and 63c, and 62d and 63d, which are adjacent on the four side parts 61a–61d, are polarized. Two phase input voltages A and B, which have phases that differs by $\pi/2$, are applied to the piezoelectric elements 62a–62d and 63a–63d.

The pairs of adjacent piezoelectric elements 62a and 63a, 62b and 63b, 62c and 63c, 62d and 63d are mutually polarized such that they have polarity in the same direction. The high frequency voltages A and B have a temporal phase difference of $\pi/2$. In addition, the pairs of piezoelectric elements 62a and 63a, 62b and 63b, 62c and 63c, and 62d and 63d may also be polarized in mutually opposite directions.

The drive force take-off member 64a, 64b, 64c, and 64d take off power produced by the elliptical vibration produced by the longitudinal vibration and flex vibration of elastic member 61. The drive force take-off members 64a–64d undergo relative movement while contacting the fixed member (relative movement member) to which they have pressure contact. The drive force take-off members 64a–64d are arranged on the bottom surface of the elastic member 61 near the vertices of the regular quadrangle. The position near the vertices avoids positions which are the joints of longitudinal vibration produced by the elastic member 61 and are in the middle of the up and down vibration produced by the flex vibration mode in a nearly perpendicular direction in relation to the plane of movement.

The drive force take-off members 64a–64d are made of silicon nitride to improve anti-abrasion characteristics. The ends of the drive force take-off members 64a–64d are contract parts having curved surfaces so that they do not interfere with the elliptical movement.

FIG. 24A indicates the temporal changes of the two phase high frequency voltages A and B that are input to the vibration motor 60 at times $t_1$–$t_9$. The horizontal axis of FIG. 24A indicates the actual value of the high frequency voltage. FIG. 24B indicates the cross-sectional transformations of the vibration motor 60, at times ($t_1$–$t_9$), of the flex vibration. FIG. 24C indicates the cross-sectional transformations of the vibration motor 60, at times ($t_1$–$t_9$), of the expansion and contraction vibration. FIG. 24D indicates the changes, at times ($t_1$–$t_9$), of the elliptical movement produced by the drive force take-off members 64b and 64c on the side part 61c. The transformations of the side parts 61a, 61b, and 61d are the same as the transformations of side part 61c.

As indicated in FIG. 24A, at time $t_1$, the high frequency voltage A produces a positive voltage, and the high frequency voltage B produces a positive voltage. As indicated in FIG. 24B, the flex vibration based on the high frequency voltages A and B mutually cancel each other out, and points Y1 and Z1 have an amplitude equal to 0. As indicated in FIG. 24C, the expansion and contraction vibration based on the high frequency voltages A and B are produced in the direction of expansion. As indicated by the arrows, points Y2 and Z2 undergo maximum expansion, centered on a joint X. As a result, as indicated in FIG. 24D, both the amplitudes are compounded, the synthesis of the movement of the points Y1 and Y2 is the movement of a point Y, and the synthesis of the movements of the points Z1 and Z2 is the movement of a point Z.

At time $t_2$, the high frequency voltage B becomes 0, and the high frequency voltage A produces a positive voltage. Flex vibration is produced by the high frequency voltage A, the point Y1 oscillates in the negative direction and the point Z1 oscillates in the positive direction. Expansion and contraction movement is generated by the high frequency voltage A and the points Y2 and Z2 contract. As a result, both of the vibrations are combined, and the material points Y and Z move clockwise.

At time $t_3$, the high frequency voltage A produces a positive voltage, and the high frequency voltage B produces an equal negative voltage. The flex movement is combined and amplified by the high frequency voltages A and B causing the point Y1 to be amplified in the negative direction and undergo maximum negative oscillation. The point Z1 oscillates in the positive direction and reaches the maximum positive oscillation. The expansion and contraction movement, based on the high frequency voltages A and B, cancel each other out, and the points Y2 and Z2 return to their original positions. As a result, both the vibrations are combined, and the points Y and Z move clockwise.

At time $t_4$, the high frequency voltage A becomes 0, and the high frequency voltage B produces a negative voltage. Flex movement is produced by the high frequency voltage B, the amplitude of point Y1 drops and the amplitude of the point Z1 drops. Expansion and contraction movement is produced by the high frequency voltage B, and the points Y2 and Z2 contract. As a result, both the vibrations are combined, and the points Y and Z move clockwise.

At time $t_5$, the high frequency voltage A produces a negative voltage and the high frequency voltage B produces a negative voltage. The flex movement caused by the high frequency voltages A and B mutually cancel each other out, and the amplitude of the points Y1 and Z1 is 0. Moreover, the expansion and contraction movement caused by the high frequency voltages A and B are produced in the contraction direction. As indicated by the arrow, the points Y2 and Z2 undergo the maximum contraction, centered on joint X. As a result, both the vibrations are combined, and the points Y and Z move clockwise.

Following the changes at time $t_6$ through time $t_9$ flex vibration and expansion and contraction vibration are produced as described above, and as a result, as indicated in FIG. 24D, the point Y and the point Z move elliptically clockwise.

The vibration motor 60 produces elliptical movement on the front ends of the drive force take-off members 64a through 64d, and produces a drive force. Consequently, when pressurizing the front end of the drive force take-off members 64a through 64d onto a fixed part, the elastic member 11 self-advances in relation to the fixed part.

The vibration motor 60 causes a compound vibration of flex vibration and expansion and contraction vibration respectively on the side parts 61a and 61c by applying high frequency voltages A and B, which differ in phase by $\pi/2$ respectively, on the piezoelectric elements 62a and 63a and the piezoelectric elements 62c and 63c, so as to produce elliptical movement on the ends of drive force take-off members 64a through 64d facing the X direction. Meanwhile the vibration motor 60 causes compound vibration of flex vibration and expansion and contraction vibration respectively on the side parts 61b and 61d by applying high frequency voltages A and B, which differ in phase by $\pi/2$ respectively, on the piezoelectric elements 62b and 63b, and the piezoelectric elements 62d and 63d, so as to produce elliptical movement on the ends of drive force take off parts 64a through 64d facing the Y direction.

The control of the side parts 61a and 61c and the side parts 62c and 63b may be executed mutually independently, or simultaneously. If executed independently, the vibration motor 60 moves independently in the X direction and Y direction. By conducting control simultaneously, the vibration motor 60 moves in a direction that is a synthesis of the X direction and the Y direction.

FIG. 25 is a block diagram showing the application of drive voltages to the piezoelectric elements 62a–62d and 63a–63d. An oscillator 70 applies high frequency voltages A and B to the piezoelectric elements 62a and 63a. The output of the oscillator 70 is split and after the phase has been temporarily shifted by $\pi/2$ by a phase shifter 71X (for the X direction) and a phase shifter 71Y (for the Y direction), one signal is connected to an amplifier 72X (for the X direction) and an amplifier 72Y (for the Y direction), and the other signal is directly connected to an amplifier 73X (for the X direction) and amplifier 73Y (for the Y direction).

The amplifiers 72X, 72Y, 73X, and 73Y are connected to the piezoelectric elements 62a–62d, and 63a–63d through transfer switches 74 and 75, and transfer switches 76a, 76b, 76c, and 76d. The transfer switches 76a–76d are normally all ON.

When the transfer switch 74 is to the top (as shown in FIG. 25), high frequency voltages A and B are applied to piezoelectric elements 62a and 63c and piezoelectric elements 63a and 62c causing the vibration motor to translate in the ±X direction. When the transfer switch 75 is to the top (as shown in FIG. 25), the high frequency voltages A and B are applied to the piezoelectric elements 63b and 62d and the piezoelectric elements 62b and 63d, causing the vibration motor 60 to translate in the ±Y direction.

When the transfer switch 74 is to the bottom, the high frequency voltages A and B are applied to the piezoelectric elements 63a and 63c and the piezoelectric elements 62a and 62c causing the vibration motor 60 to rotate about a central part 0.

When the transfer switch 75 is to the bottom, the high frequency voltages A and B are applied to the piezoelectric elements 63b and 63d and the piezoelectric elements 62b and 62d causing the vibration motor 60 to rotate with central part 0 as the center of rotation.

Further, it is possible to apply a drive voltage to one or the other of opposing frame side parts 61a and 61c, and 61b and 61d by turning transfer switches 76a–76d OFF. In this configuration, the rotational force is used on vibration motor 60, and the vibration motor 60 is made to rotate and move.

The vibration motor 60 translates one or both sides in the X direction and Y direction by applying a drive voltage such that opposing piezoelectric elements move in the same direction. Thus, it is possible not only to cause translation but also rotation by applying drive voltages such that opposing piezoelectric elements move in mutually opposite directions.

FIG. 26 is a cross-sectional diagram of an image blur suppression device incorporating the vibration motor 60. The vibration motor 60 is secured by the connecting rods 21a–21d (only connecting rod 21a is shown) installed on the flange part 32 of the lens frame 31. The drive force take off parts 64a–64d (only drive force take off part 64a is shown) of the vibration motor 60 have pressure contact with the slide material 40c affixed to the inside bottom surface of the bottom part 40a of case 40.

By applying a drive voltage from the drive voltage device (not shown) to the piezoelectric elements 62a–62d and 63a–63d, the vibration motor 60 slides in relation to slide material 40 allowing the lens frame 31 to move in relation to case 40.

Although the ninth embodiment of the present invention has been described with respect to a specific configuration, it will be recognized that the ninth embodiment is not limited to the specific configuration.

Figure 27:
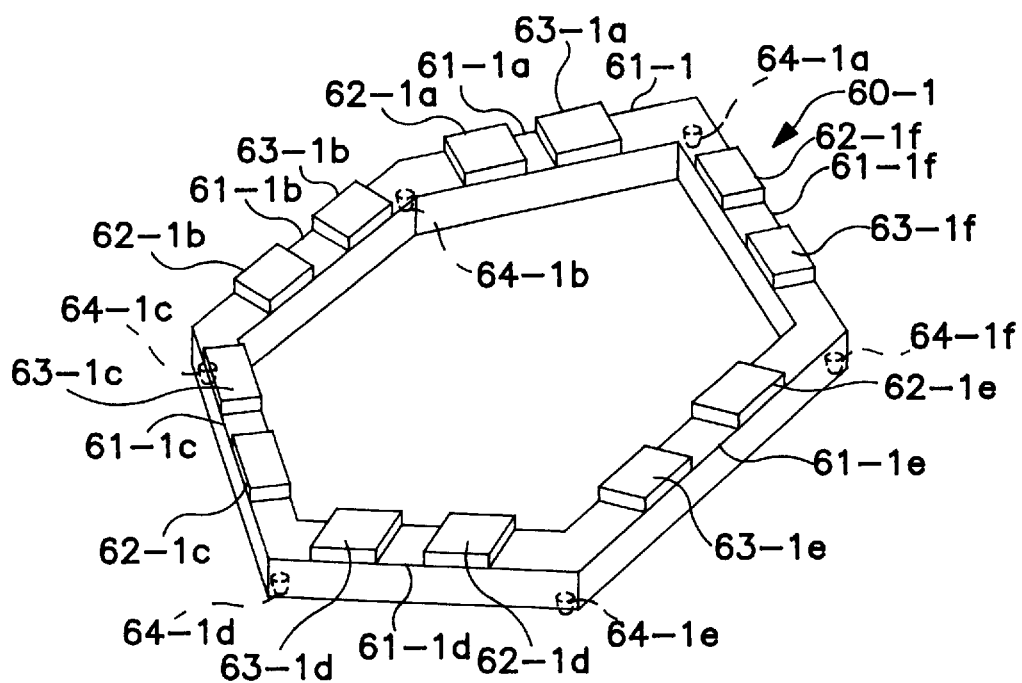
FIG. 27 is a perspective diagram of a vibration motor in accordance with a tenth preferred embodiment of the present invention.

FIG. 27 is a perspective diagram of an vibration motor in accordance with a tenth embodiment of the present invention, for use as a drive source of an image blur suppression device. The vibration motor 60-1 generally comprises: an elastic member 61-1 having a frame plate with an external regular hexagon shape; piezoelectric elements 62-1a and 63-1a, 62-1b and 63-1b, 62-1c and 63-1c, 62-1d and 63-1d, 62-1e and 63-1e, and 62-1f and 63-1f, joined to the six frame side parts 61-1a, 61-1b, 61-1c, 61-1d, 61-1e, and 61-1f of the elastic member 61-1; and drive force take-off members 64-1a, 64-1b, 64-1c, 64-1d, 64-1e, and 64-1f arranged near the six vertices of the elastic member 61-1. It is possible to increase the directions of orientation of the piezoelectric elements by making the external shape of the elastic member 61-1 more polygonal, and to increase the movement directions of the piezoelectric elements that are installed on this frame side parts of this elastic member 61-1.

Although the tenth embodiment of the present invention has been described with respect to a specific configuration, it will be recognized that the tenth embodiment is not limited to the specific configuration.

Figure 28:
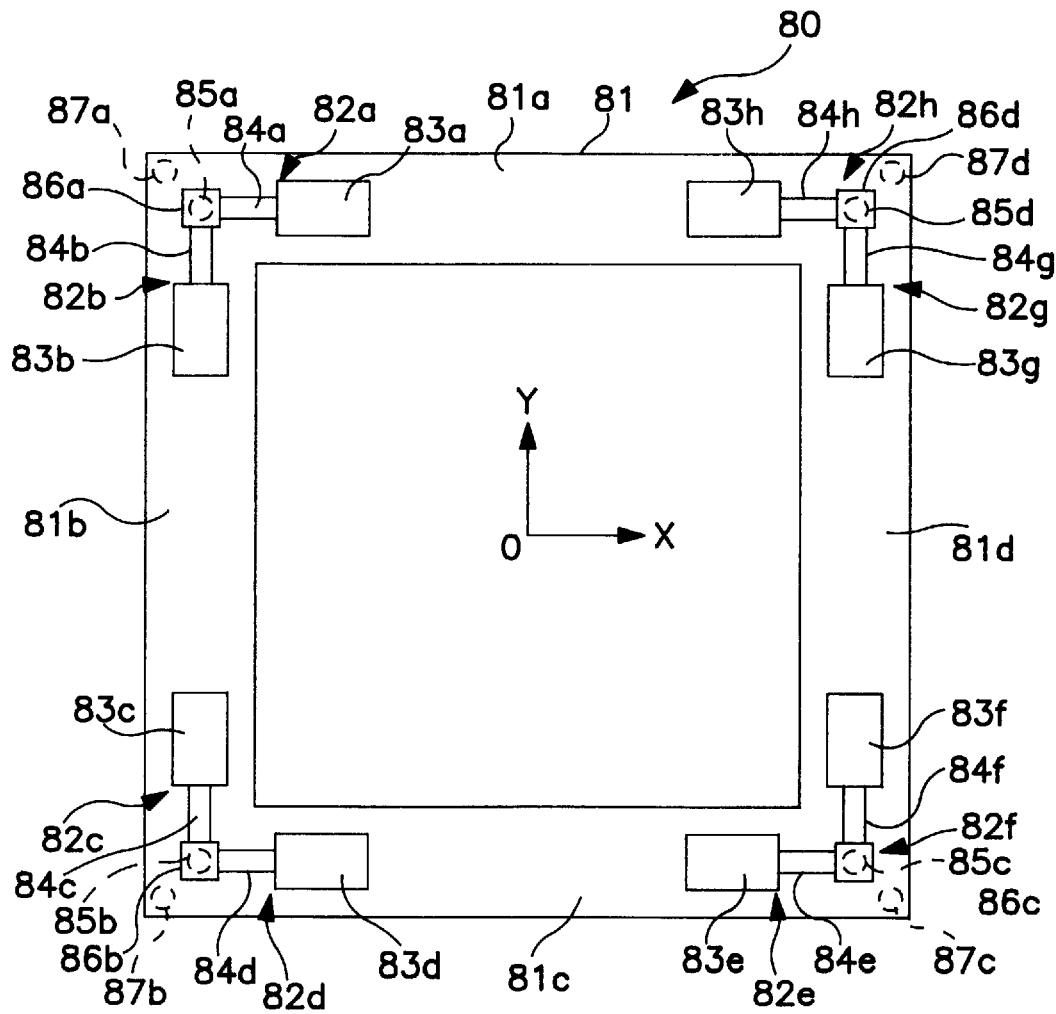
FIG. 28 is a plan view of a vibration motor in accordance with an eleventh preferred embodiment of the present invention.

FIG. 28 is a plan view of an vibration motor 80 in accordance with an eleventh preferred embodiment of the present invention for use in an image blur suppression device. In accordance with the eleventh preferred embodiment, a so-called impact drive type actuator is used.

A square frame plate shaped elastic body 81 is provided with eight impact drive type actuators arranged in pairs, namely, 82a and 82b, 82c and 82d, 82e and 82f, and 82g and 82h, near the four vertices mutually intersecting at 90° each mutually along frame side parts 81a through 81d. The impact drive type actuators 82a, 82b, 82c, 82d, 82e, 82f, 82g and 82h, each have one end of rod shaped laminated piezoelectric elements 84a, 84b, 84c, 84d, 84e, 84f, 84g, and 84h attached to solid inertia bodies 83a, 83b, 83c, 83d, 83e, 83f, 83g and 83h.

The ends of the piezoelectric elements 84a and 84b are attached to a solid moving member 86a which, in turn, is attached to the front end of the impact attachment rod 85a which protrudes from one surface of the elastic body 81. The ends of the piezoelectric elements 84c and 84d are attached to a solid moving member 86b which is attached to the front end of impact attachment rod 85b that protrudes from one surface of elastic member 81. The ends of the piezoelectric elements 84e and 84f are attached to a solid moving member 86c which is attached to the front end of impact attachment rod 85c that protrudes from one surface of elastic member 81. The ends of the piezoelectric elements 84g and 84h are attached to a solid moving member 86d which is attached to the front end of impact attachment rod 85d that protrudes from one surface of elastic member 81. Thus, the moving members 86a–86d are secured to the elastic member 81 through impact attachment rods 85a–85d. The inertia members 83a–83h and the rod shaped laminated piezoelectric elements 84a–84h do not make contact with the surface of elastic member 81.

Rod shaped contact members 87a–87d have spherical shaped ends that protrude from the surface near the vertices of elastic member 81. The spherical shaped ends make pressure contact with securing members (not shown).

The impact drive type actuators 82a–82h are excited by applying drive voltage to piezoelectric elements 84a–84h. The impact drive type actuator 82a is used as an example to explain the drive of all the impact drive type actuators 82a–82h. The piezoelectric element 84a suddenly contracts when a drive voltage with a large voltage increase rate is applied to piezoelectric element 84a from the drive voltage device (not shown). Accompanying the sudden contraction, the inertia member 83a is tensioned facing the moving member 86a and the impact attachment rod 85a. This cause the elastic member 81 to move toward the upper right direction, in the plane of the diagram. Afterwards, when a drive voltage with a small voltage reduction rate is applied, elastic member 81 stops when the static friction coefficient becomes large, and the inertia member 83a continues to move facing moving member 86a. The moving members 86a–86d, supported by impact attachment rods 85a–85d, are utilized as relative movement members in the vibration motor 80.

Consequently, in accordance with the eleventh preferred embodiment, it is possible to translate the elastic member 81 linearly in a displacement direction by applying a drive voltage which causes the piezoelectric elements (for example, piezoelectric elements 84a and 84d and piezoelectric elements 84b and 84g, etc.) arranged in opposing positions, facing the same direction, to be displaced in the same direction. The elastic member 81 can move two dimensionally in the X direction and the Y direction because some piezoelectric elements are arranged for X direction movement (84a, 84d, 84e, and 84h) and some piezoelectric elements are arranged for Y direction movement (84b, 84c, 84f, and 84g).

While two dimensional movement may be executed independently in the respective directions, diagonal movement produces the shortest linear movement in the smallest time. Therefore it is possible to improve responsiveness by utilizing diagonal movement in an image blur suppression device of a camera. In addition, it is possible to cause the elastic member 81 to rotate using the central point 0 as the center of rotation by applying the drive voltage which causes piezoelectric elements (for example, 82a and 82e and 84c and 84g, etc.) arranged in diagonally opposing positions, to be displaced in opposite directions. Note that while eight impact drive type actuators are shown, it is possible to move in one direction even if only one impact drive actuator is provided on opposing frame side parts.

Figure 29:
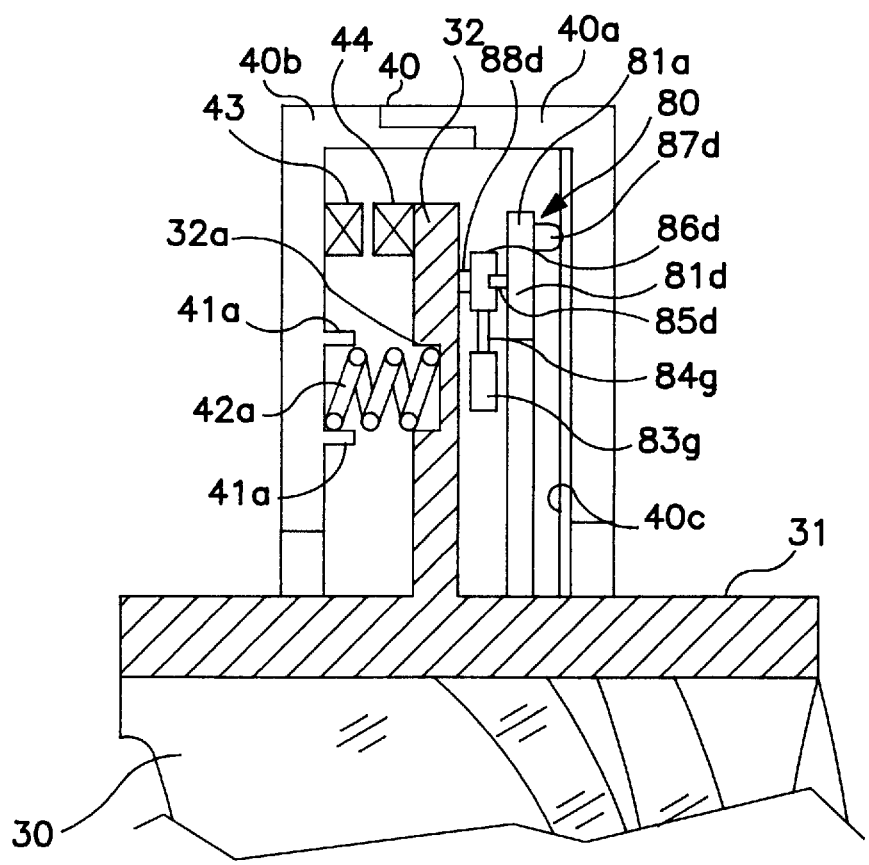
FIG. 29 is a cross-sectional diagram-of an image blur suppression device in accordance with the eleventh preferred embodiment of the present invention.

FIG. 29 is a cross-sectional diagram of an image blur suppression device incorporating the vibration motor 80 in accordance with the eleventh preferred embodiment of the present invention. The movement members 86a–86d are attached to the flange part 32 of the lens frame 31 through the connecting rods 88a–88d. The impact drive type actuators 82a through 82h are attached such that lens frame 31 moves freely in a plane nearly orthogonal to the optical axis.

The vibration motor 80 is biased toward the slide material 40c by the springs 41a–41d through the connecting rods 86a–86d and the flange part 32. The lens frame 31 is caused to have relative movement, in relation to the case 40, by the vibration motor 80 moving in one or both directions of the X direction and Y direction. Further, as noted above, when the vibration motor 8 is caused to move linearly, at a diagonal to the desired position of movement, the responsiveness of the image blur suppression device can be improved. Moreover, unnecessary vibrations produced during the impact drive of the impact drive type actuators 82a–82h are suppressed because the impact drive type actuators 82a–82h are provided on the flange part 32 without being directly provided on the lens frame 31.

Although the eleventh embodiment of the present invention has been described with respect to a specific configuration, it will be recognized that the eleventh embodiment is not limited to the specific configuration.

Figure 30:
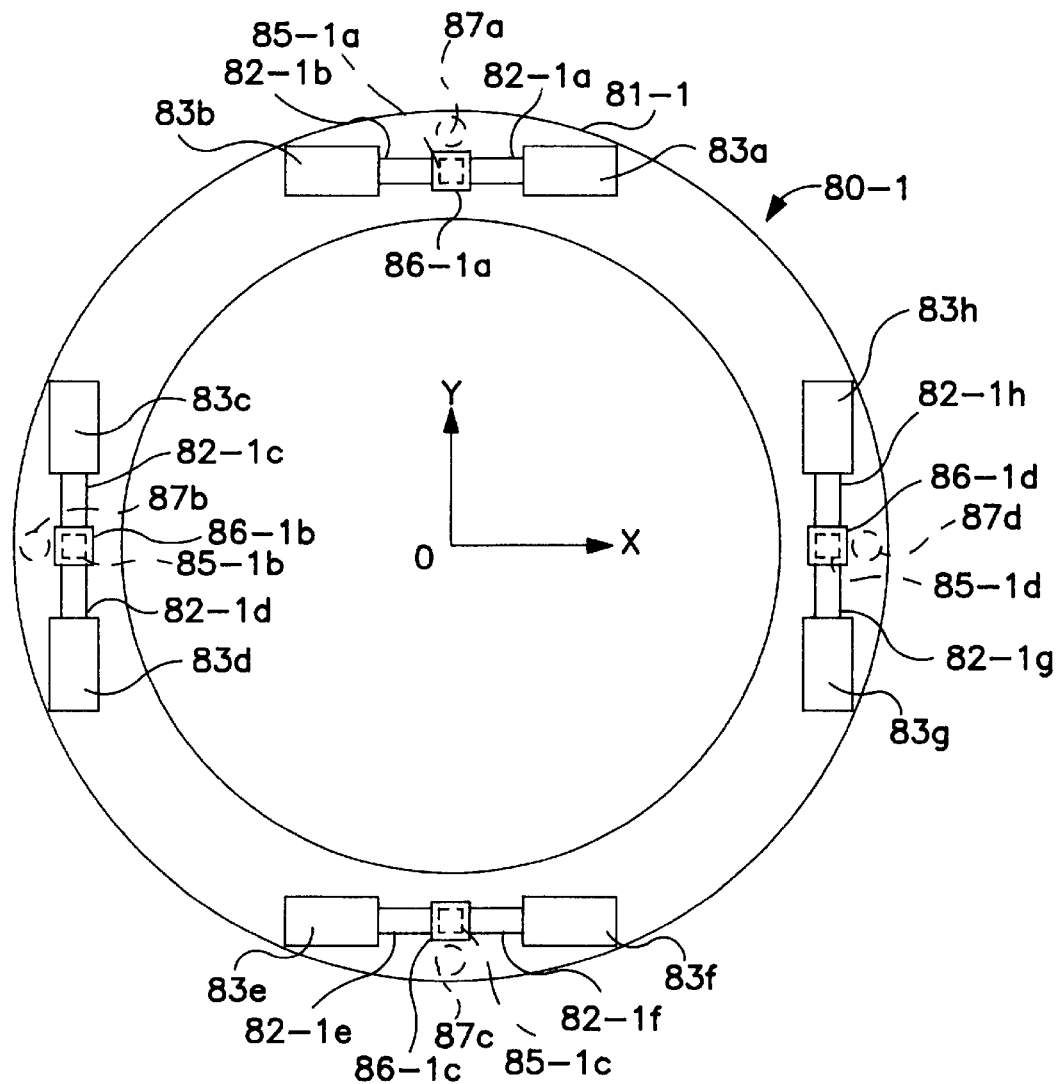
FIG. 30 is a top view of an image blur suppression device in accordance with a twelfth preferred embodiment of the present invention.

FIG. 30 is a top view of an vibration motor 80-1 in accordance with a twelfth preferred embodiment of the present invention. An elastic member 81-1 is ring-shaped with impact drive type actuators 82-1a to 82-1h, attached to inertia members 83a–83h, arranged in opposing pairs mutually oriented to the same direction on movement members 86-1a to 86-1d. The movement members 86-1a to 86-1d are attached to impact attachment rods 85-1a to 85-1d provided on four points of the elastic member 81-1 at locations differing by 90°. Contact member 8 87a–87d are provided on the opposite side of the elastic member 81-1. The vibration motor 80-1 indicated in FIG. 30 is completely the same as the vibration motor 80 indicated in FIG. 9 in all other respects, and further explanation will be omitted.

Although the twelfth embodiment of the present invention has been described with respect to a specific configuration, it will be recognized that the twelfth embodiment is not limited to the specific configuration.

Figure 31:
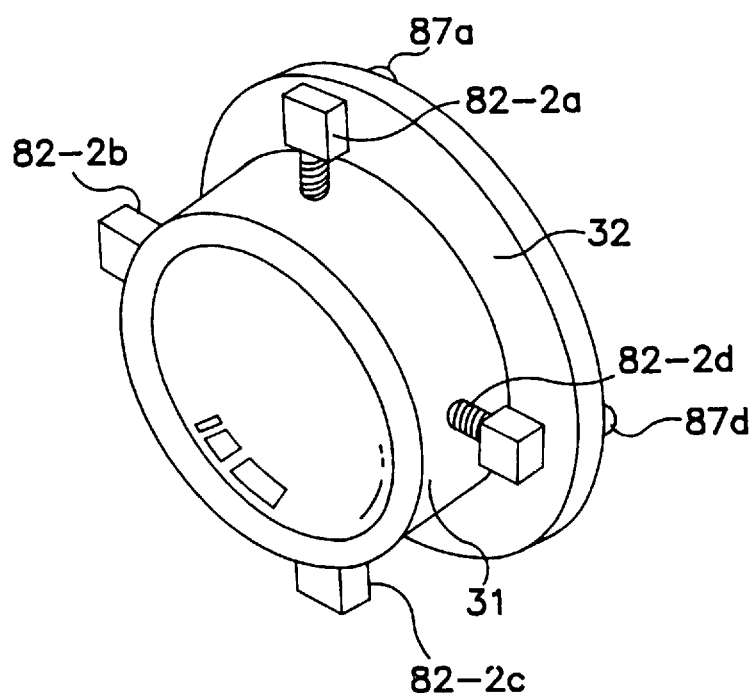
FIG. 31 is a perspective diagram of a lens frame in accordance with a thirteenth preferred embodiment of the present invention.
Figure 32:
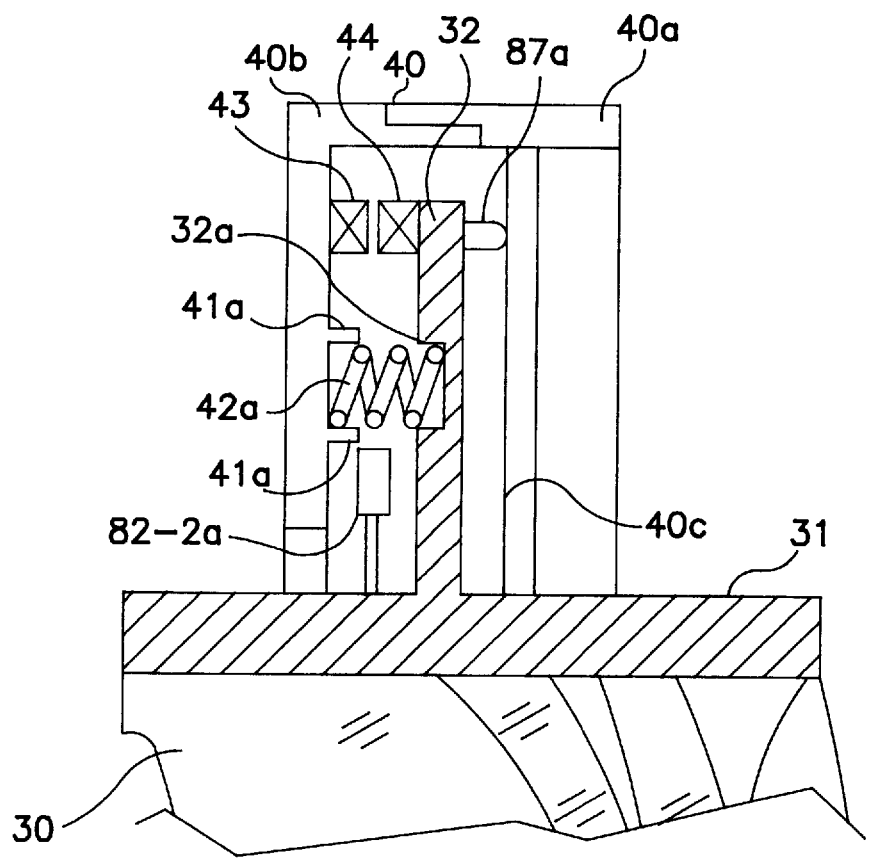
FIG. 32 is a cross-sectional diagram indicating a partial expansion of an image blur suppression device in accordance with the thirteenth preferred embodiment of the present invention.
Figure 33:
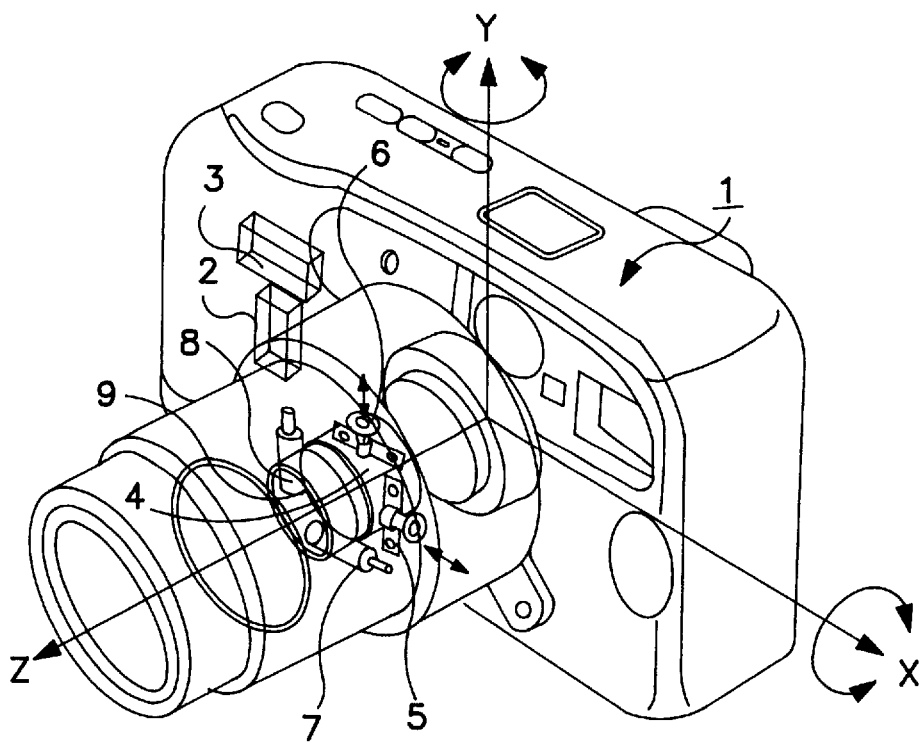
FIG. 33 is a perspective diagram of a camera which incorporates a conventional image blur suppression device.

FIG. 31 is a perspective diagram of a lens frame 31 in accordance with a thirteenth preferred embodiment of the present invention. FIG. 32 is a cross-sectional diagram of an image blur suppression device incorporating the lens frame 31. As indicated in FIG. 31, four impact drive type actuators 82-2a to 82-2d are provided at 90° degree intervals on the outer surface of the lens frame 31. The lens frame 31 is provided on the inner part of the case 40 (not shown) such that drive force take-off members 87a–87d have pressure contact with the slide material 40c (not shown).

Because the structure around the flange part 32 of the lens frame 31 can be simplified, the thickness, in the direction of the optical axis, of the case 40 is reduced, thereby reducing the weight of a camera body.

Various vibration motors have been described, however, any type of vibration motor may be used if the lens frame which supports the lens of the image blur suppression optical system can move freely in an orthogonal plane or a nearly orthogonal plane in relation to the optical axis. Further, the image blur suppression devices described above may be used in telescopes, binoculars, the XY stage of a microscope, and feed devices for plotter paper, etc. Also, while piezoelectric elements are utilized as electromechanical converting elements, the invention is not limited to this, and electrostrictive elements and magnetostrictive elements may be used.

Although a few of the preferred embodiments have been shown and described, it would be appreciated by those skilled in the art that changes may be made in these embodiments without departing from the principles and spirit of the invention, the scope of which is defined in the claims and their equivalents. Further, one of ordinary skill in the art will recognize that while the preferred embodiments have been shown and described as being used within an optical camera, they may be adapted for use in any device in which it is desirable to suppress blurring of an image formed by an optical system, for example, in camcorders, motion picture cameras, telescopes, binoculars, microscopes, range finding equipment, lasers, fiber optic communication systems, various optical projection systems and CD mastering systems.

What is claimed is:

1. An image blur suppression device for suppressing image blur in an image formed by a main optical system having an optical axis, the image blur suppression device comprising:
    an image blur suppression optical system arranged to move within a plane substantially orthogonal to an optical axis of the main optical system; and
    a vibration motor that moves said image blur suppression optical system so as to compensate for image blur.

2. An image blur suppression device, as set forth in claim 1, wherein said vibration motor produces a drive force by generating two vibration modes and utilizing elliptical movement produced by a synthesis of the two vibration modes.

3. An image blur suppression device, as set forth in claim 1, further comprising:
    a lens frame surrounding said image blur suppression optical system, said lens frame being freely movable in a plane, substantially orthogonal to the optical axis of the main optical system.

4. An image blur suppression device, as set forth in claim 3, further comprising:
    a slide surface arranged opposite the vibration motor; and
    a biasing unit which biases the vibration motor toward said slide surface.

5. An image blur suppression device, as set forth in claim 1, wherein said vibration motor is free to move in two dimensions.

6. An image blur suppression device, as set forth in claim 1, wherein said vibration motor provides an opening to house a lens supporting said image blur suppression optical system.

7. An image blur suppression device, as set forth in claim 1, wherein said vibration motor comprises:
    an elastic member formed of elastic material having a hollow circular plate form; and
    an electro-mechanical converting element joined to the elastic member, said electro-mechanical converting element vibrates so as to generate expansion and contraction movement and flex movement on said elastic member so as to generate elliptical movement on a specified part of said elastic member.

8. An image blur suppression device, as set forth in claim 7, wherein a ratio of an external diameter and an internal diameter of said elastic member being selected such that the respective resonance frequencies of the expansion and contraction movement and the flex movement substantially agree.

9. An image blur suppression device, as set forth in claim 7, wherein said vibration motor further comprises a drive force take-off member provided on the specified part of said elastic member.

10. An image blur suppression device, as set forth in claim 9, wherein the end of said drive force take-off member is a curved surface member.

11. An image blur suppression device, as set forth in claim 9, wherein said drive force take-off member is joined to the surface of said electro-mechanical converting element by an insulating member.

12. An image blur suppression device, as set forth in claim 7, wherein the flex vibration causes a joint circle to be produced on said elastic member.

13. An image blur suppression device, as set forth in claim 7, wherein said electro-magnetic converting element comprises:
    a plurality of electro-magnetic converting elements arranged on a surface of said elastic member, said plurality of electro-magnetic converting elements being grouped into a first group for operation in a first direction and a second group for operation in a second direction.

14. An image blur suppression device, as set forth in claim 13, wherein:
    the first group of electro-mechanical converting elements is provided on a different surface than the second group of electro-mechanical converting elements.

15. An image blur suppression device, as set forth in claim 7, wherein said electro-mechanical converting element is laminated onto said elastic member.

16. An image blur suppression device, as set forth in claim 1, wherein said vibration motor comprises:
    an elastic member having a polygon outer shape with at least one pair of opposing parallel sides; and
    a plurality electro-mechanical converting elements joined to said elastic member, including the parallel sides of the elastic member so as to generate longitudinal vibration mode and flex vibration mode on said elastic member thereby generating elliptical movement on a specified position of said elastic member.

17. An image blur suppression device, as set forth in claim 16, wherein said electro-mechanical converting elements joined to said elastic member are independently controllable.

18. An image blur suppression device, as set forth in claim 16, further comprising:
    a plurality of drive force take-off member on the specified position of the elastic member.

19. An image blur suppression device, as set forth in claim 18, wherein the ends of the drive force take-off members are provided with a curved surface member.

20. An image blur suppression device, as set forth in claim 16, wherein the polygon outer shape is a regular quadrangle, and the specified position is near a vertex of the regular quadrangle.

21. an image blur suppression device, as set forth in claim 16, wherein the polygon outer shape is a regular hexagon, and the specified position being near a vertex of the regular hexagon.

22. An image blur suppression device, as set forth in claim 1, wherein said vibration motor is an impact drive type actuator comprising:
    a relative movement member;
    an electro-mechanical converting element having one end arranged on the relative movement member, said electro-mechanical converting element being excited by a voltage; and an inertia member is attached to a second end of the electro-mechanical converting element, said inertia member imparts an impact force to the relative movement member.

23. An image blur suppression device, as set forth in claim 22, further comprising:

a lens frame which supports said image blur suppression optical system, said lens frame freely movable in a plane substantially orthogonal to the optical axis.

24. An image blur suppression device, as set forth in claim 23, wherein impact drive type actuators are arranged in four locations where two perpendicular straight lines extending from the center of the lens frame intersect with the circumference of the lens frame.

25. An image blur suppression device, as set forth in claim 23, wherein eight impact drive type actuators are positioned on symmetrical positions on said elastic member and are secured on a separate flange parts protruding from an outer surface of said lens frame.

26. An image blur suppression device, as set forth claim 25, wherein an outer shape and an inner shape of said elastic member is square, wherein symmetrical positions are near the vertices of the square, and wherein eight impact drive type actuators are arranged along each side part of the square near the four vertices.

27. An image blur suppression device, as set forth in claim 25, wherein the outer shape and the inner shape of the frame are circular, wherein the symmetrical positions being four positions where two straight perpendicular lines extending from the center of the elastic member intersect with the elastic member, and wherein eight impact drive type actuators are arranged two each at the four positions.

28. An image blur suppression device, as set forth in claim 22, wherein the flex vibration causes a joint circle to be produced on said elastic member.

* * * * *

UNITED STATES PATENT AND TRADEMARK OFFICE
CERTIFICATE OF CORRECTION

PATENT NO.: 5,870,634
DATED : February 9, 1999
INVENTOR(S): Isao Sugaya et al.

It is certified that error appears in the above-identified patent and that said Letters Patent is hereby corrected as shown below:

Column 22, line 58, (claim 21), change "an" to --An--.

Signed and Sealed this

Twenty-second Day of June, 1999

Attest:

Q. TODD DICKINSON

*Attesting Officer*     *Acting Commissioner of Patents and Trademarks*